(12) United States Patent
McDaid et al.

(10) Patent No.: US 9,813,433 B2
(45) Date of Patent: Nov. 7, 2017

(54) SYSTEM AND METHOD FOR EMBEDDED MOBILE (EM)/MACHINE TO MACHINE (M2M) SECURITY, PATTERN DETECTION, MITIGATION

(71) Applicant: Adaptive Mobile Security Limited, Dublin (IE)

(72) Inventors: Cathal McDaid, Dublin (IE); Hugh Carr, Dublin (IE); Mark Buckley, Dublin (IE)

(73) Assignee: Adaptive Mobile Security Limited, Dublin (IE)

( * ) Notice: Subject to any disclaimer, the term of this patent is extended or adjusted under 35 U.S.C. 154(b) by 0 days.

(21) Appl. No.: 14/770,083

(22) PCT Filed: Feb. 21, 2014

(86) PCT No.: PCT/EP2014/053413
§ 371 (c)(1),
(2) Date: Aug. 24, 2015

(87) PCT Pub. No.: WO2014/128253
PCT Pub. Date: Aug. 28, 2014

(65) Prior Publication Data
US 2016/0006753 A1    Jan. 7, 2016

Related U.S. Application Data

(60) Provisional application No. 61/768,121, filed on Feb. 22, 2013.

(30) Foreign Application Priority Data

Mar. 7, 2013  (EP) ................................. 13158193

(51) Int. Cl.
*H04L 29/00* (2006.01)
*H04L 29/06* (2006.01)
(Continued)

(52) U.S. Cl.
CPC .......... *H04L 63/1416* (2013.01); *G06F 21/55* (2013.01); *H04L 43/00* (2013.01);
(Continued)

(58) Field of Classification Search
CPC .......... H04L 63/02; H04L 63/14; G06F 21/05
See application file for complete search history.

(56) References Cited

U.S. PATENT DOCUMENTS 8,565,755 B1 * 10/2013 Badakere Ramachandra ..... H04L 43/0817
370/230
8,984,632 B1    3/2015  Laffoon et al.
(Continued)

FOREIGN PATENT DOCUMENTS

| WO | WO 2013/009345 A1 | 1/2013 |
|---|---|---|
| WO | WO 2014/128253 A1 | 8/2014 |

OTHER PUBLICATIONS

Notification of Transmittal of the International Search Report and the Written Opinion of the International Searching Authority, or the Declaration, for International Application No. PCT/EP2014/053413, titled: System and Method for Embedded Mobile (EM)/Machine to Machine (M2M) Security, Pattern Detection, Mitigation, Date of Mailing: Jun. 4, 2014, 7 pages.

(Continued)

*Primary Examiner* — Madhuri Herzog
(74) *Attorney, Agent, or Firm* — Hamilton, Brook, Smith & Reynolds, P.C.

(57) ABSTRACT

The invention provides a security system and method for use in a communications network, said network comprising means to allow a plurality of devices to communicate over the network wherein at least one device is a machine to machine (M2M) operated device and at least one other device is a human operated device, said security system comprising: means to capture data traffic originating from (Continued)

the plurality of devices on the network; means for analysing the data traffic; and means for identifying at least one of the M2M operated devices on the network wherein the system is configured to dynamically adapt to different data traffic patterns on the network.

18 Claims, 5 Drawing Sheets

(51) Int. Cl.
  *G06F 21/55* (2013.01)
  *H04W 4/00* (2009.01)
  *H04L 12/26* (2006.01)
  *H04L 12/24* (2006.01)

(52) U.S. Cl.
  CPC .......... *H04L 43/04* (2013.01); *H04L 63/0227* (2013.01); *H04L 63/0245* (2013.01); *H04L 63/1425* (2013.01); *H04W 4/005* (2013.01); *H04L 41/069* (2013.01); *H04L 43/028* (2013.01); *H04L 43/062* (2013.01); *H04L 43/065* (2013.01)

(56) References Cited

U.S. PATENT DOCUMENTS 9,351,167 B1    5/2016  Adams et al.
2001/0039623 A1  11/2001 Ishikawa
2003/0200464 A1  10/2003 Kidron
2004/0148520 A1   7/2004 Talpade et al.
2004/0268147 A1  12/2004 Wiederin et al.
2005/0091532 A1*  4/2005 Moghe ................ H04L 63/1408
                                                 726/4
2007/0266149 A1  11/2007 Cobb et al.
2011/0047620 A1   2/2011 Mahaffey et al.
2012/0220326 A1*  8/2012 Li ......................... H04W 4/005
                                                 455/509
2012/0294158 A1* 11/2012 Boot .................... H04L 63/1416
                                                 370/252
2013/0276135 A1  10/2013 Conklin et al.
2013/0291100 A1* 10/2013 Ganapathy .......... H04L 63/1466
                                                 726/22
2014/0040503 A1   2/2014 Mower et al.
2016/0006755 A1   1/2016 Donnelly et al.
2016/0014149 A1   1/2016 Bradley et al.
2016/0182662 A1*  6/2016 Casey ................. H04L 41/5035
                                                 709/224

OTHER PUBLICATIONS

Shabtai, Asaf, et al. ""Andromaly": a behavioral malware detection framework for android devices." Journal of Intelligent Information Systems 38.1 (2012): 161-190.

* cited by examiner

SYSTEM AND METHOD FOR EMBEDDED MOBILE (EM)/MACHINE TO MACHINE (M2M) SECURITY, PATTERN DETECTION, MITIGATION

This application is the U.S. National Stage of International Application No. PCT/EP2014/053413, filed Feb. 21, 2014, which designates the U.S., published in English, and claims priority under 35 U.S.C. §§119 or 365(c) to European Application No. 13158193.6, filed Mar. 7, 2013, which claims the benefit of U.S. Provisional Application No. 61/768,121, filed Feb. 22, 2013. The entire teachings of the above applications are incorporated herein by reference.

FIELD

The invention relates to Embedded Mobile (EM) or mobile M2M (Machine to Machine) machines used in a communications network.

BACKGROUND

Embedded Mobile (EM) or mobile M2M (Machine to Machine) is the enabling of machines, as well as people, to communicate via mobile networks, and enabling device connectivity to facilitate many varied applications across numerous diverse industries.

Although M2M may at the outset have been used to define Machine to Machine communication, there is now an understanding of a wider M2M, or Embedded Mobile (EM) concept, which refers to a host of devices and services using the mobile network to provide communications between machines themselves and also with people. The terms Embedded Mobile (EM) and (mobile) M2M (Machine to Machine) are used interchangeably, unless otherwise specified.

M2M is positioned to become a very significant growth area within mobile networks. It is predicted in the future that the number of EM/M2M devices and communications associated with them will greatly exceed that of human devices and associated communications.

With large growth in M2M devices, comes attendant growing security threats. Furthermore there are factors which demand greater security in communications with Embedded Mobile/Machine to Machine devices (EM/M2M devices) relative to devices used for Human communications, and operators such as Mobile Network Operators (MNOs) face growing challenges and security threats from the large scale deployment of EM/M2M devices which can take many forms including:

- Autonomous/Unsecured nature of devices which are not under direct human control or oversight.
- Remote Location/Accessibility of devices means that the cost of investigating and repairing is likely to be much higher than human devices such as smartphones.
- Long-term nature of devices means they will not be swapped or recycled within a long timeframe, for example 2/3 years.
- Potentially limited capability on devices means that the ability to embed software to perform security is much lessened.
- Potentially more catastrophic effects to life and property if unavailable/compromised.

What are required are mechanisms to identify an M2M device as opposed to a device used for Human communication, and determine if it has been compromised and to take effective action.

PCT patent publication number WO2013009345, assigned to Intel Corporation, discloses a system and method for machine-to-machine communications using short message services (SMS). The system presented by Intel Corporation is a static pre-configured system for optimising M2M communications using SMS via signalling based optimisations. However a problem with the Intel system is that it is unable to analyse and identify M2M devices on the network for different traffic data.

It is an object of this invention to provide a system and method for Embedded Mobile (EM)/Machine to Machine (M2M) Security, Pattern detection, and mitigation.

SUMMARY

According to the invention there is provided, as set out in the appended claims, a security system for use in a communications network, said network comprising means to allow a plurality of devices to communicate over the network wherein at least one device is a machine to machine (M2M) operated device and at least one other device is a human operated device, said security system comprising:
- means to capture data traffic originating from the plurality of devices on the network;
- means for analysing the data traffic; and
- means for identifying at least one of the M2M operated devices on the network, wherein the system is configured to dynamically adapt to different data traffic patterns on the network.

In another embodiment a method of providing security in a communications network, said network comprising means to allow a plurality of devices to communicate over the network wherein at least one device is a machine to machine (M2M) operated device and at least one other device is a human operated device, said method comprising:
- capturing data traffic originating from the plurality of devices on the network;
- analysing the data traffic; and
- identifying at least one of the M2M operated devices on the network, wherein the method dynamically adapts to different data traffic patterns on the network.

In one embodiment the means for analysing comprises examining at least one unique identifier obtained from the captured data traffic.

In one embodiment the unique identifier is selected from at least one of: IMEI (International Mobile Equipment Identity), IMSI (International Mobile Subscriber Identity), MSISDN (Mobile Subscriber ISDN Number), MDN (Mobile Directory Number), ESN (Electronic Serial Number), MEID (Mobile Equipment Identifier), MIN (mobile identification number), ICCID (integrated circuit card ID), URI (Uniform Resource Identifier), IMPI (Internet Protocol Multimedia Private Identity) (which can be for example a SIP (Session Initiation Protocol) URI or a TEL URI), Fully qualified Domain Name (FQDN), Network Access Identifiers (NAI), IP address V4, IP address V6.

In one embodiment the system comprises means for communicating with one or more operator network elements such as an operator's HLR (Home Location Register) or HSS (Home Subscriber Server, which may be co-located with the HLR) to lookup identification information of at least one device such as the IMSI, ESN, MEID, IMPI.

In one embodiment the system comprises means to extract features from the captured data traffic wherein these features describe the behavioural patterns of individual devices on the network, and/or wherein the feature extraction comprises extraction of event content features from the traffic stream, which describe the single event based on its content, and/or wherein the features extracted from the feature extraction means are stored defined by their data traffic characteristics numerically derived from the captured data traffic and descriptive of the device behaviour.

In one embodiment feature extraction is adapted to extract events from the captured traffic data and collates them by sender in order to derive per-device features and adapted to calculate statistics which refer to multiple events from the same source, such that one or more characteristic profile features can be calculated for a given sender device.

In one embodiment said feature extraction further comprises calculating temporal statistics describing each device's traffic patterns, based on the timestamps of the events sent by that device.

In one embodiment the features extracted from the feature extraction means are stored according to a classification system based on said analysing means.

In one embodiment if a particular device is identified as a M2M device, the system comprises means to store the traffic patterns to and from these devices said patterns are adapted to be used as baseline reference traffic patterns for detecting other M2M devices.

In one embodiment the system comprising means for identifying normal traffic characteristic patterns, said patterns are adapted to be used as baseline patterns for detection of patterns of behaviour which deviate from these normal behavioural patterns.

In one embodiment there is provided means to ascertain if there are traffic patterns corresponding to normal characteristic patterns associated with M2M device activity, wherein said patterns are configured to be used as control signature patterns for detecting other M2M devices behaving normally.

In one embodiment there is provided means to ascertain out of the ordinary communication patterns associated with M2M device activity, wherein said patterns are configured to be used as control signature patterns for detecting other M2M devices behaving abnormally.

In one embodiment there is provided means for analysing traffic patterns to discern and analyse message content features and/or other traffic information with reference to dynamic pattern rules and means for aggregating such message content features across all messages sent by a device to detect which M2M group a device belongs to.

In one embodiment said means for analysing comprises means for computing the total word vocabulary of messages sent by a device, wherein the distribution of word frequencies acts as a signature for the text of messages originating from the device; and means for identifying at least one of the M2M operated devices from said computed word vocabulary.

In one embodiment there is provided means for extracting vocabulary data from the captured data; and means for differentiating comprises computing the distribution of word frequencies from the vocabulary data to determine whether a device exhibits human or machine originated traffic.

In one embodiment there is provided means for data extraction of vocabulary data from the captured data; means for computing the total word vocabulary of messages sent by a device, wherein the distribution of word frequencies acts as a signature for the text of messages originating from the device. It will be appreciated that the signature acts as a means for identifying at least one of the M2M operated devices from said computed word vocabulary.

In one embodiment vocabulary data of a human-originated message comprises a sample from a large set of human-language dictionary words indicative of natural language and stored in an event store.

In one embodiment machine-generated messages are determined by measuring divergence from the overall vocabulary of the event store to indicate a machined generated message.

In one embodiment there is provided means for labelling M2M devices from known stored patterns of devices in the device information store which are known to be M2M devices, then their patterns can be used to predict whether other devices are M2M.

In one embodiment there is provided means for pseudo labelling M2M devices from suspected stored patterns of devices in the device information store which are suspected to be M2M devices, then their patterns can be used to predict whether other devices are M2M.

In one embodiment there is provided means for clustering similar devices, wherein each cluster comprises a model of a typical traffic pattern, and/or comprising means for detecting a shift in a traffic pattern to determine a change in device behaviour, wherein a sudden change in behaviour from a device indicates suspicious behaviour, and/or means for detecting a shift in a traffic pattern to determine a gradual change in a device behaviour over time; and means for reclassifying the device into a new cluster based on the new traffic behaviour that best matches the traffic pattern for the new cluster.

In one embodiment there is provided means for extracting, for each cluster, a general characterisation of the patterns that the devices in it share, such that the regularity measure is on average in a certain range, or that most elements of the cluster send to a similar number of peers.

In one embodiment there is provided means to detect changes in a device's behaviour based only on using its relationship to other devices in the cluster.

In one embodiment there is provided at least one network probe for data traffic acquisition, and/or wherein the network probe comprises means for generating statistics on any layer of the communication stack that has information that is of interest.

In one embodiment there is provided means for examining at least one available underlying network identifier associated with a device's traffic to ascertain if it can identify that the device is an M2M device and optionally wherein for SMS identified traffic, the network Identifier is selected from at least one of: SMSC (Short Message Service Centre) address, a virtual or real Service Centre Address (SCA), a destination SCCP (Signalling Connection Control Port) address (MO), source SCCP address (MT); or wherein for IP identified traffic, the network Identifier is selected from the address of the GGSN (Gateway GPRS Support Node) or APN (Access Point Name) and/or location information.

In one embodiment there is provided a means to detect devices from which both machine-generated or algorithmically-generated and human-generated data are sent and means for differentiating between senders who are M2M devices and senders who exhibit patterns of both human and machine traffic.

In one embodiment there is provided means for detecting normal traffic characteristic patterns for an M2M device and can detect out of the ordinary communication patterns to and from an M2M device; means to establish whether the out of the ordinary communication poses a security or other threat or signifies malicious activity; and means for applying security defensive measures if a security threat is posed.

In one embodiment the applied security defensive measures comprises temporarily or indefinitely suspending services for an M2M device.

In one embodiment there is provided a network service quarantine adapted to provide policy control for blocking all or selective traffic for one or more bearers or services or applications going to or from one or more entities, which may be identified by an identifier or address, any of which can originate or terminate traffic.

In one embodiment there is provided means to perform network service quarantine and network device revocation and quarantine, and protect additional critical M2M services.

The invention provides means to identify that a device is an M2M device as opposed to a device used for Human communication. The invention also provides a means to determine if a device has been compromised to take effective action.

One of the problems of definitively identifying a device as a M2M device, is that there is no standardised global identifier that allows one determine from numbering or other identification information that a device is an M2M device. The invention can make use of the available numbering or other identification information as part of the process to identify a device as being an M2M device.

The invention provides means such as a network security service to capture, track/monitor and analyse many varied types of communications including IP and messaging (such as SMS) on the network, to discern behavioural/signature communication and traffic patterns typically associated with at least one M2M device. The traffic patterns are typically realised as a set of dynamic pattern rules which are continuously updated from the communications on the network, but can be realised in any model which appropriately and generically describes the traffic patterns.

The invention applies means such as heuristic based classification, using methods such as a combination of one or more of the following (which are examples and non-limiting), namely, traffic analysis, including temporal/regularity metrics analyses, numbering characteristics analysis, network identifiers analysis, location information analysis, peer network behavioural metrics analyses, group behavioural metrics analyses, event content features analysis, event content abstraction features analysis on captured traffic patterns for sending and receiving events of devices (including communications with EM/M2M command and control centres or other parties with which the devices are in communication with), with reference to dynamic pattern rules to identify an EM/M2M device, by comparing the traffic patterns that have been discerned from the communications of the device in question, with the traffic patterns that have been discerned from the communications of other devices which the invention captures or tracks/monitors, and using aggregation methods to detect if an EM/M2M device can be grouped with other EM/M2M devices.

The invention having identified a device as being an M2M device also has means to identify the particular M2M device.

The invention tracks/monitors and analyses the captured traffic data to ascertain if there are traffic patterns corresponding to normal characteristic patterns associated with M2M device activity, or out of the ordinary communication patterns associated with M2M device activity (both to and from M2M devices).

Advantageously having discerned that the device is an M2M device and identified that there are out of the ordinary communication patterns to and from the device, the invention further identifies whether the out of the ordinary communication poses a security or other threat or signifies malicious activity. The invention in such instances has means for applying appropriate security defensive measures.

In a further embodiment there is provided a system of providing security in a communications network, said network comprising means to allow a plurality of devices to communicate over the network wherein at least one device is a machine to machine (M2M) operated device and at least one other device is a human operated device, said system comprising:
 a data capture module for capturing data traffic originating from the plurality of devices on the network;
 an analyser module for analysing the data traffic; and
 an identifier module for identifying at least one of the M2M operated devices on the network, wherein the method dynamically adapts to different data traffic patterns on the network.

There is also provided a computer program comprising program instructions for causing a computer program to carry out the above method which may be embodied on a record medium, carrier signal or read-only memory.

BRIEF DESCRIPTION OF THE DRAWINGS

The invention will be more clearly understood from the following description of an embodiment thereof, given by way of example only, with reference to the accompanying drawings, in which:—

DETAILED DESCRIPTION OF THE DRAWINGS

Figure 1:
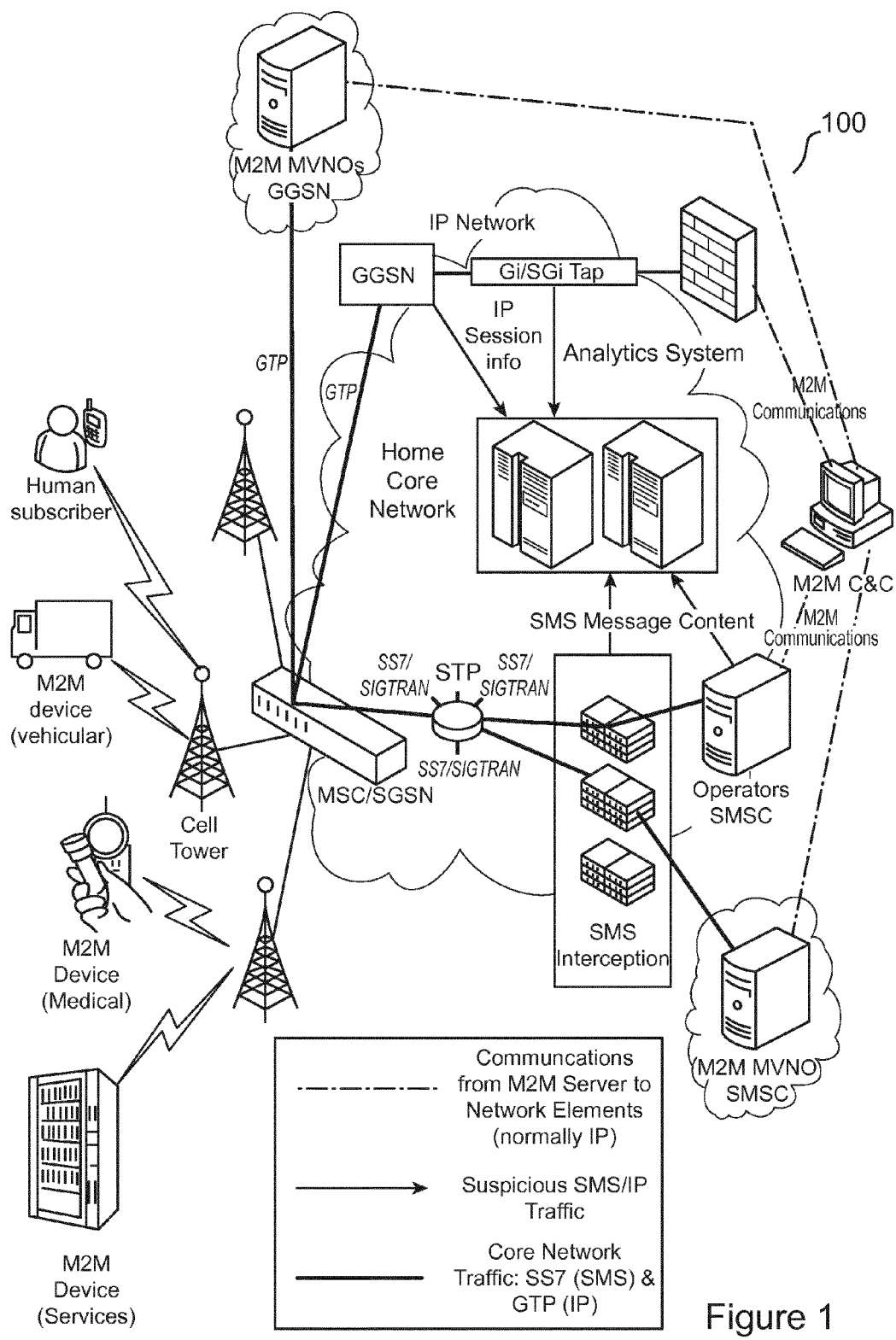
FIG. 1 illustrates a network environment in which a network security service is embodied as an analytics system/module according to one aspect of the invention.

FIG. 1 illustrates a network environment 100 in which a network security service embodied as an analytics system/module according to the invention may operate. The figure illustrates a variety of M2M devices communicating with M2M command and control centres. The network security service of the invention comprises means to capture, track/monitor and analyse traffic patterns over time, from many varied types of communications including IP and messaging (such as SMS) on the network, and to discern behavioural/signature patterns typically associated with at least one M2M device.

Also illustrated is a MVNO (Mobile Virtual Network Operator) SMSC, to indicate a dedicated SMSC for a MVNO offering specialist M2M services. An M2M MVNO GGSN is also depicted. MVNOs that supply network nodes dedicated to handle M2M traffic as well as offering services by purchasing resources such as airtime from MNOs are sometimes termed Mobile Machine Operators (MMOs).

Although not illustrated in FIG. 1, the invention can also intercept traffic on the communications path of the GTP interface, between an SGSN and a GGSN or in alternative embodiments intercept traffic such as for example on the communications path of the GTP interface between an SGSN and an M2M MVNO GGSN. FIG. 1 illustrates the invention as residing in the core network of the operator however the invention could equally be hosted outside such a network, for example as a cloud-based network security service.

In one embodiment he invention is adapted to perform the following steps:

The network security service has at least one network probe for data acquisition.

The system examines the available numbering or other identification information associated with a device to ascertain if it can identify that the device is an M2M device. The numbering information can be for example IMEI (International Mobile Equipment Identity), IMSI (International Mobile Subscriber Identity), MSISDN (Mobile Subscriber ISDN Number), MDN (Mobile Directory Number), ESN (Electronic Serial Number is a device identifier pertaining to the CDMA family of standards/technologies, refer to section further aspects of the invention for further detail), MEID (Mobile Equipment Identifier, which is replacing ESN) etc. The invention can discover additional identifiers than those present in the captured traffic, Thus if particular identification information is not available in the captured traffic, the invention can endeavour to discover such identifiers by using one or more identifiers that are available and communicating with one or more operator network elements such as an operator's HLR to lookup additional identification information such as for example the IMSI, ESN, MEID, etc.

The invention examines the available underlying network identifier(s) associated with a device's traffic and how such traffic is routed through the network, to ascertain if it can identify that the device is an M2M device. For SMS, network Identifiers can be for example SMSC address, Service Centre Address (SCA) which can be a virtual or real SCA, and/or the destination SCCP address (MO) or source SCCP address (MT). For IP, network Identifiers can be for example, the address of the GGSN or APN if available.

If the invention can definitively identify a particular device as an M2M device then the traffic patterns to and from these devices can be used to baseline reference traffic patterns for detecting other M2M devices which cannot be definitively identified as such based on their numbering information.

The network security service of the invention tracks/monitors and analyses the captured traffic data to ascertain if there are traffic patterns corresponding to normal characteristic patterns associated with M2M device activity, or out of the ordinary communication patterns associated with M2M device activity (with such communication/traffic patterns including both to and from M2M devices, and to and from other parties such as M2M Command and Control Centres).

The network security service persists detected or suspected traffic patterns to and from M2M devices.

The invention extracts and derives features pertinent for M2M behaviour detection from the captured traffic data stream.

The invention applies means such as heuristic based classification, using methods such as a combination of one or more of the following (which are examples and non-limiting), namely, traffic analysis, including temporal/regularity metrics analyses, numbering characteristics analysis, network identifiers analysis, location information analysis, peer network behavioural metrics analyses, group behavioural metrics analyses, event content features analysis, on captured traffic patterns for sending and receiving events of devices (including communications with M2M command and control centres or other parties with which the devices are in communication with), with reference to dynamic pattern rules to identify an M2M device, and using aggregation methods to detect if an M2M device can be grouped with other M2M devices.

The network security service of the invention also analyses traffic patterns to discern and analyse message content features with reference to dynamic pattern rules and can aggregate such message content features across all messages sent by a device to detect which M2M group a device belongs to.

Having identified normal traffic characteristic patterns, it uses these patterns as baseline patterns for detection of patterns of behaviour which deviate from these normal behavioural patterns.

Persisting out of the ordinary communication patterns detected to and from M2M devices, advantageously enables such patterns to be used as control signature patterns for detecting other M2M devices behaving abnormally.

The invention performs further analysis to ascertain whether the out of the ordinary communication poses a security or other threat or signifies malicious activity such as exhibiting known malware traffic patterns or behaviour, for example such as those associated with suspected malware infection.

Thus by monitoring, analysing and persisting traffic patterns, the invention can detect normal traffic characteristic patterns for an M2M device and can detect out of the ordinary communication patterns to and from an M2M device and establish whether the out of the ordinary communication poses a security or other threat or signifies malicious activity and further has means for applying appropriate security defensive measures.

Figure 2:
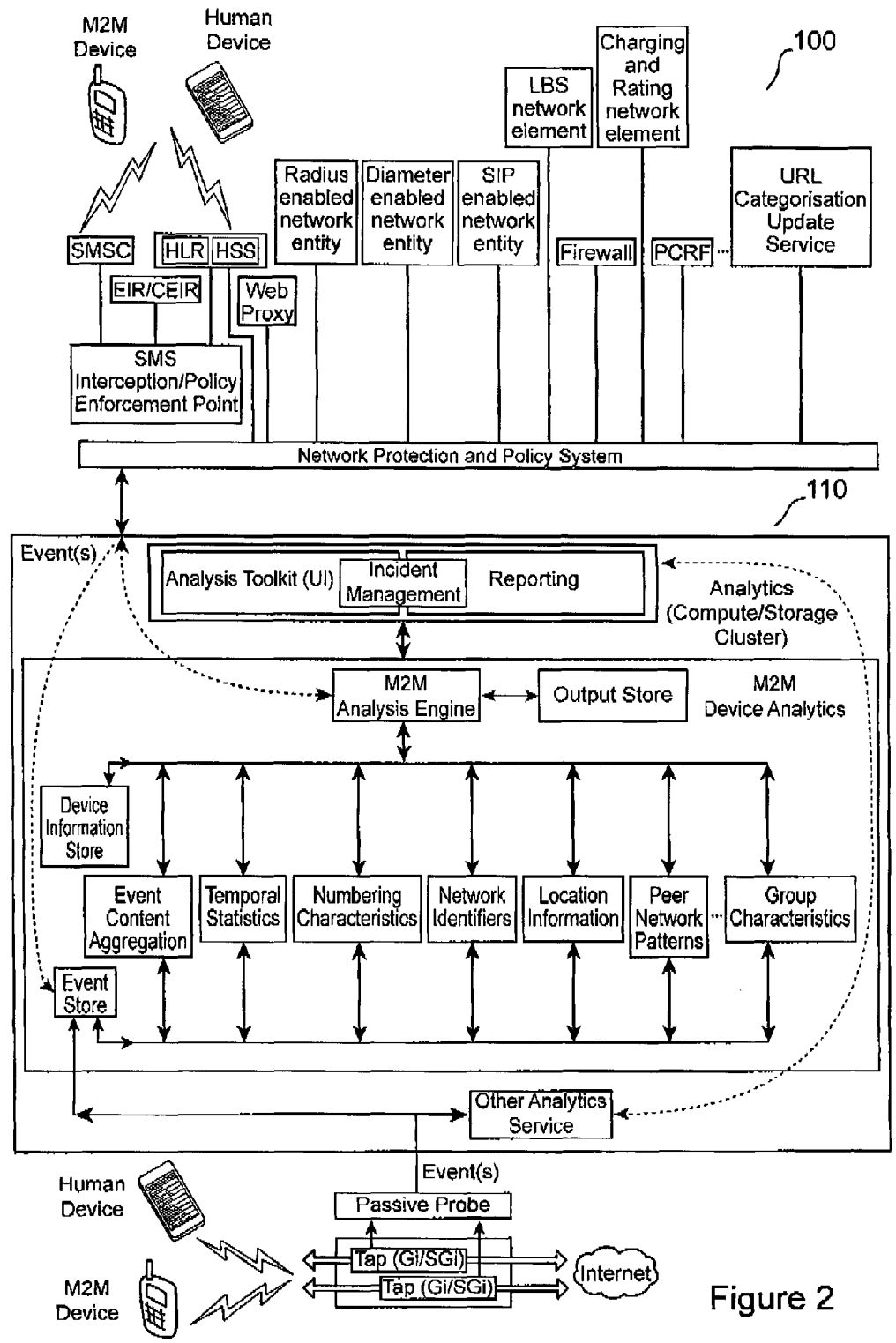
FIG. 2 illustrates in more detail a network security service embodied as an analytics module distributed on several servers in which the system according to the invention may be embodied.

FIG. 2 illustrates in more detail a network security service embodied as an analytics module 110 distributed on several servers in which the system according to the invention may be embodied. The invention captures network traffic and tracks/monitors and analyses the captured traffic data. The traffic data captured includes such communications as communications to/from M2M device(s), to/from M2M command and control centres (or other parties with which the devices are in communication), and also communications involving human controlled devices.

Although not shown in FIG. 2, as well as the ability to capture and track/monitor and analyse IP traffic (including for example traffic on the communications path of the GTP or Gi or SGi interfaces) and messaging such as SMS traffic on the network (via for example an SMS interception/SMS Policy Enforcement Point (PEP) as shown in FIG. 1 and FIG. 2. the system of the invention has the ability to capture and track/monitor and analyse traffic patterns over time, from many varied types of communications including other messaging technologies in addition to SMS.

Although the network security service of the invention is depicted in FIG. 2 above interfacing with other network elements (which include for example one or more instances of Radius enabled network entity, Diameter enabled network entity, SIP enabled network entity, Home Subscriber Server (HSS), Location Based Services (LBS) network element, Web Proxy, Firewall, Charging and Rating network element, PCRF, URL categorisation service Update service, etc.) via a Network Protection and Policy System (or equivalent or similar) such as that provided for example by the Adaptive Mobile Security (AMS) Network Protection Platform (NPP)—www.adaptivemobile.com—or equivalent or similar, however in alternative embodiments the network security service of the invention can communicate/interface to such network elements (directly or by other means), without a Network Protection and Policy System (such as that provided by the AMS NPP (or equivalent or similar)) being required.

Further although the network security service of the invention is depicted in FIG. 2 interfacing with other network elements (which include for example SMSC, HLR, EIR, CEIR, etc.) via a Network Protection and Policy System in conjunction with an SMS Interception/Policy Enforcement Point (which may or not be an AMS system), however in alternative embodiments the network security service of the invention can communicate/interface to such network elements via an SMS Interception/Policy Enforcement Point (which may or not be an AMS system), without a Network Protection and Policy System (such as that provided by the AMS NPP (or equivalent or similar)) being required or in an alternative embodiment can communicate/interface to such network elements (directly or by other means) without either a Network Protection and Policy System, or an SMS Interception/Policy Enforcement Point being required.

Also the Network Protection and Policy System (or equivalent or similar) need not be that provided by the AMS NPP.

It is worth noting that some network entities can be co-located (for example HSS which in many embodiments may be co-located with HLR) and some network entities can support multiple protocols or technologies (for example a network entity could support SIP and/or Diameter, and/or Radius).

Identification of M2M Devices from Numbering Information.

Although there is currently no standardised global unique identifier (as there are no standardised global numbering plans or global numbering ranges defined for M2M devices) that allows one determine definitively from numbering information or other identification that a device is an M2M device as opposed to a human controlled device, nevertheless the invention examines the available numbering and other identification information as advantageously for example:

Identifying definitively a particular device as an M2M device allows the traffic patterns to and from such a device to be used to baseline reference traffic patterns, which can be used for detecting other M2M devices, which cannot be definitively identified as such based on their numbering or other identification information, If such identification information is available it can complement traffic patterns observed, for example in the case where the IMEI (International Mobile Equipment Identity) is obtained, the system of the invention can identify the device model type, the manufacturer, the date and country of approval, which allows the system to build a more specific device profile, allowing correlation with known vulnerabilities, if they happen to be device specific, If such identification information is not available in the captured traffic, the invention can endeavour to discover it by communicating with one or more network elements such as an operator's HLR to lookup subscriber identification information such as the subscriber's IMSI.

However as outlined below, ascertaining definitively from numbering or other identification information that a device is an M2M device as opposed to a human controlled device often proves to be indeterminate.

Although operators are considering options to address the growing shortage of telephone numbers due to the dramatic growth of M2M devices, such as assigning dedicated E. 164 number ranges to M2M devices (with some operators doing this but in a non-standardised approach using their own bespoke numbering ranges), and notwithstanding that there are some standardisation activities in this area, including that standardization bodies such as 3GPP are discussing future solutions such as not assigning normal numbering plans (such as normal E. 164 numbering plans) i.e. no longer issuing normal E.164 telephone numbers for M2M devices/applications but rather assigning special M2M number ranges (for example assigning longer telephone numbers). However no such approaches are currently standardized, with M2M devices currently often using the operator's normal numbering range and normal network, thus being indistinguishable in those aspects from devices used for human traffic.

Thus even if an operator such as an MNO has for example assigned:

number ranges (such as unique/dedicated IMSI ranges) to M2M devices, number ranges (such as unique/dedicated IMSI ranges) to M2M MVNOs or Mobile Machine Operators (MMOs), within the MNO for assigning to their M2M devices, or an M2M MVNO or MMO has a private SMSC with private numbering plans assigned;

this may or may not cover all their M2M devices (depending for example on when such number range or numbering plan assignment was introduced), and in any event there are those MNOs who have not assigned number ranges or numbering plans to M2M devices.

A further challenge is that even a unique identifier such as SIM/IMSI cannot be wholly depended upon in the context of M2M devices. For M2M devices it is not unusual to have multi tenancy where an M2M device can have multiple MSISDNs, i.e. can have multiple SIMs (for multiple operators). This is because M2M service providers want to be able to respond to the best commercial deal at a particular time, and this demands being able to migrate potentially very large numbers of devices at the same time to a different operator (s). Furthermore a particular SIM/IMSI may be used over a very long duration so it may not be apparent that there are multiple SIMs associated with a particular M2M device, which poses particular challenges as regards monitoring. This challenge is further compounded by the fact that notwithstanding that devices currently use different IMSIs and MSISDNs when on different networks by having physically different SIM cards, a key aspect of M2M in the near future is enabling remote provisioning by using Soft-SIMs or Embedded SIMs, which will allow updating of M2M devices with such SIMs with different IMSIs/MSISDNs.

As already mentioned device numbering/identification information can include for example IMEI (International Mobile Equipment Identity), IMSI (International Mobile Subscriber Identity), MSISDN (Mobile Subscriber ISDN Number), MDN (Mobile Directory Number), etc, and if such identification information is not available in the captured traffic, the invention can endeavour to discover the relationship between an available identifier and other identifiers, by communicating with one or more operator network elements such as an operator's HLR to lookup identification information for example such as the IMSI.

Another example of numbering information or other identification information which can be used to identify a device as an M2M device include ICCID (integrated circuit card ID) with the relationship between this and other identifiers such as the IMSI being obtainable via HLR interrogation and thus can be made available to the network security service of the invention.

Further examples of numbering information or other identification information which are under consideration by mobile standards and industry bodies for use to identify an M2M device (which the invention can analyse), include for example URI, IMPI (Internet Protocol Multimedia Private Identity which can be for example a SIP URI or a TEL URI), TEL URI can for example contain an E. 164 number or private number, Fully qualified Domain Name (FQDN), Network Access Identifiers (NAI) for example M2MID @example.com, IP address V4, IP address V6 etc.

Thus in the case of a SIP URI, the mapping between this and a particular IMSI or IMPI is obtained for example via HSS (which in many embodiments may be co-located with HLR) interrogation, in networks which support SIP or IMS, and thus can be made available to the network security service of the invention.

In some cases an MVNO/MNO may provision an M2M device on a Network Protection and Policy System (or equivalent or similar) such as that provided by the Adaptive Mobile Security NPP (or equivalent or similar)) in which case this information can be made available to the network security service of the invention.

Thus where it can be ascertained definitively from numbering or other identification information that a device is an M2M device as opposed to a device for human communications the invention makes use of such information, however as discussed above since this is not standardised, and many approaches are currently being used, with many approaches also under consideration by mobile standards and industry bodies, this can often prove to be indeterminate. What is needed and is addressed by the security system and method, are other independent approaches to identify an M2M device, which do not rely on numbering or other device identification to identify an M2M device. Thus as described in later sections the network security service of the invention captures network traffic and tracks/monitors and analyses the captured traffic data to ascertain if there are traffic patterns corresponding to normal characteristic patterns associated with M2M device activity, or out of the ordinary communication patterns associated with M2M device activity (both to and from M2M devices) in order to identify an M2M device deterministically.

Data Capture and Records/Statistics Generation

In one embodiment, the network security system and method of the invention (in one embodiment an analytics system/module) communicates with at least one network tap, which enables mirroring of IP network traffic to the off-net probe of the invention for real time capture, tracking/monitoring and analysis of IP network traffic. In one embodiment, the network tap can be connected for example on the communications path of the Gi interface (IP based interface which serves as a reference point between typically the GGSN and typically an external packet data network such as the Internet), or connected on the communications path of the LTE equivalent which is the SGi interface, (namely the reference point between the PDN GW and the packet data network where packet data network may for example be an operator-external public or private packet data network or an intra-operator packet data network, for example for provision of IMS services), as illustrated in FIG. 1 and FIG. 2, or the network tap can be connected on the communications path of the GTP interface, between an SGSN and a GGSN, or in alternative embodiments on the communications path of the GTP interface between an SGSN and an M2M MVNO GGSN or the network tap can be connected on the communications path of any suitable interface as required.

In one embodiment the off-net network probe of the invention generates statistics on the replica of the on-net IP network traffic that it receives from the network probe, thus advantageously not affecting the operation of the network in any way.

Thus in one embodiment the off-net network probe of the invention generates and augments netflow statistics which are passed to the network security service (in one embodiment an analytics system). Netflow is a well-known network protocol developed by CISCO for collecting IP information. In this embodiment the network probe as well as generating standard netflow statistics can generate additional statistics on any layer of the communication stack that has information that is of interest (for example identifying or recording the application or process that generated the traffic on which the statistics are based, via DPI mechanisms which include protocol inspection and protocol identification. The protocol identification information can also be recorded in the statistics). The network probe in alternative embodiments can generate all the statistics without recourse to the netflow network protocol such as for example using IPFix (the IETF Internet Protocol Flow Information Export protocol) or sflow (an industry standard technology developed by InMon and now under the auspices of the sFlow.org industry consortium who are focused on promoting and further technical development of the technology), etc.

The off-net network probe has at least one network interface card for data acquisition.

Although illustrated in FIG. 1 and FIG. 2, with a network tap mirroring a replica of the on-net IP network traffic to the off-net passive (passive in the sense that is not affecting the network traffic as receiving a replica of it) probe for off-net traffic capture, tracking/monitoring and analysis, the probe of the invention can equally be deployed inline on the traffic plane for inline traffic capture (without requiring a network tap) and statistics generation (where such statistics generation can be as described above for the off-net network probe). The inline network probe has at least two network interface cards to allow network traffic to flow through. The inline network probe can be deployed on the same communications paths as described above for the network tap. The inline network probe can be considered to be active, as it is in the network traffic path, processes the traffic and can actively affect the network traffic.

The network probe has the ability to sample traffic, for example load based sampling or other forms of sampling.

Advantageously the invention has flexible scaling as regards data capture, tracking/monitoring and analysis. Thus the network probe of the invention is capable of interfacing with multiple network taps, as illustrated in FIG. 2 A network probe of the invention can have flexible scaling and the invention can embody multiple network probes, which can be achieved in various ways, for example via one or more network probes having multiple ports, deploying network probes on multiple servers, deploying one or more probes for handling traffic for different technologies (for example for HTTP and SMPP) etc.

The system can also collect netflow statistics from other network elements (such as a router which supports generating netflow statistics) by acting as a netflow collector, or collect statistics from other network elements by other means and formats, such as for example using IPFix, or alternatively for example having the statistics streamed in an alternative protocol over a TCP/IP interface.

Information captured can include statistics on for example the number of TCP/IP connections and characteristics of the sessions such as connection establishment rate, connection duration, packet size, packet frequency, how the session terminated, the number of TCP RST packets detected, the source and destination addresses and ports, etc., but can also include capturing information or producing statistics on other layers such as layer 7 traffic such as HTTP session statistics, URLs, SIP session statistics, proprietary protocols, User Agent identifier etc, or any information that can be extracted from the data stream from any stack layer which can be used for example for behavioural analysis or to correlate events to identify characteristics of M2M devices (including communications with M2M command and control centres or other parties with which the M2M devices are in communication with) and indeed for identifying characteristics of human controlled devices.

Thus as well as statistics the network probe of the invention can upload for example any field from any protocol of which it has visibility including content to the network security service of the invention. Thus for example in the case of SMPP, the content of the short message field can be uploaded (as well as any other field in the protocol).

As well as the ability to capture, track/monitor and analyse IP traffic the system of the invention has the ability to capture, track/monitor and analyse traffic patterns over time, from many varied types of communications including messaging such as SMS traffic on the network (for example on an SS7/SIGTRAN network), via an SMS interception/SMS Policy Enforcement Point (PEP) as shown in FIG. 1, (where the SMS interception/SMS Policy Enforcement Point (PEP) can be part of a Network Protection and Policy system (or equivalent or similar) such as that provided by the Adaptive Mobile Security Network Protection Platform (or equivalent or similar), or can be an independent system). In a further alternative embodiment, the network security service of the invention has the ability to capture, track/monitor and analyse UDP traffic.

In alternative embodiments the network security service receives network traffic over an ICAP interface from a GGSN, or receives a network traffic feed in a LTE network from network elements such as a Serving Gateway (SGW) or PDN Gateway (PGW) via protocols supported by such network elements (for example SIP, as illustrated in FIG. 2, e.g. SIP enabled network entity).

In yet other alternative embodiments the network security service of the invention can interface to DPI service solutions to receive network traffic from them (not illustrated in FIG. 1 or FIG. 2).

In yet other alternative embodiments the system has the ability to obtain data by other means, for example Call data records (CDRs) from for example a network element such as a charging and rating system, as illustrated in FIG. 2.

Analysis Model

The network security service 110 of the invention analyses the captured traffic data to ascertain if there are patterns corresponding to normal characteristic communication/traffic patterns associated with M2M device activity and out of the ordinary communication patterns associated with M2M device activity (with such communication/traffic patterns including both to and from M2M devices, and to and from other parties such as M2M Command and Control Centres). The analysis is described schematically in FIG. 3, and refers to previous section for description of input traffic stream capture. A number of modules 120, 130, 140 are shown connected to the M2M analysis engine 150 to receive data traffic originating from the plurality of devices on the network and outputs the received data to a M2M analysis engine for analysis. The M2M analysis engine 150 identifies at least one of the M2M operated devices on the network, wherein the system is configured to dynamically adapt to different data traffic patterns on the network. The M2M analysis engine 150 is configured to output the results of the analysis engine to an output store 160.

At a high level, each record of a network communication event analysed by the invention contains at least the following information (further details of examples of what an event can contain are detailed later in this section):
1. The ID of the sender and recipient of the event
2. The event content
3. A timestamp For example in the case of SMS traffic the sender and recipient Identifiers can be for example MSISDNs or MDNs (or any suitable identifiers), and the event content is the message text.

For example in the case of web traffic the sender ID can be for example a MSISDN or MDN (or any suitable identifier), and the recipient is typically the destination IP address of the web request. The event content for example is typically the URL which was requested, along with any embedded information such as in the GET or POST or query string, and the content in responses.

In more detail some examples (non-limiting) of such features/characteristics obtained/derived from the captured traffic data include:
1. Event content features
   Descriptive features of the textual content of the event
      i. Length of the text in characters
      ii. Proportion of spaces to total length, since machine messages need not contain spaces whereas human messages do.
   "Encoding" features,
      i. Occurrence of separators such as ";" or "#"
      ii. Occurrence of known M2M keywords such as "IMEI" (count per keyword, total count) from a pre-configured list.
      iii. Occurrence of encoding characters from a given list which are not surrounded by spaces and which do not occur in emoticons, since these are evidence of a machine-parsable protocol.
   Occurrences of known standard data formats which indicate transmission of machine-generated data, for example dates, times etc. Refer to sub section single event feature in section feature extraction and derivation for further detail.

2. Per device
   Event Content abstraction features.
      i. average message length
      ii. average number of keyword occurrences
      iii. proportion of occurrence of timestamps
   Temporal sending patterns
      i. Frequency of sending events.
      ii. A measure of regularity of sending events as data is sent at regular intervals, and tends to be characterized by bursty traffic at predictable intervals.
      iii. Sometimes the M2M Command and Control centre can intermittently send an SMS wakeup message.
   Numbering Characteristics.
      i. MSISDN
      ii. IMSI
   Network Identifiers.
      i. For SMS, SMSC address, Service Centre Address (SCA) which can be a virtual or real SCA, and/or the destination SCCP address (MO) or source SCCP address (MT)
      ii. For IP, the address of the GGSN or APN if available.
   Location Information.
      i. For SMS, Cell-ID, source MSC (Mobile Originated), destination MSC (Mobile Terminated).
      ii. For IP, SGSN address.
3. Peer network patterns
   Usually 100% of the communication is between two predictable end points for a particular M2M device communication.
   Communication is often one way, less conversational patterns are observed.
   EM/M2M Traffic is mainly data upload from device to M2M Command and Control Centre, in contrast to human traffic which is mainly data download to the device.
4. Group characteristics
   Group behaviour, multiple devices exhibiting the same behaviour can be observed, for example N devices communicating to an M2M Command and Control Centre or an M2M Command and Control Centre communicating to N devices. Thus the invention can detect device groups from analysing the control centre they are communicating with.
   Data should be similar for similar service M2M devices.

Feature Extraction and Derivation.

In this embodiment all features for a device (with the exception of single event features) are stored in the device information store. This stores all information which the invention records about each device which is active on the network, including for example a combination of one or more of the following (which are examples and non-limiting), namely, event content abstraction features, temporal statistic features, numbering characteristics (as already described which identifies whether a device is M2M, for some subset of the total set of devices), network identifiers, location information and also includes peer network patterns and group characteristics.

Single Event Feature

The first stage in the analysis is the extraction of event content features from the traffic stream, which describe the single event based on its content. Examples of the event content features are given in the previous section.

As already noted, but in further detail, as regards the occurrence of known standard data formats such as dates, times, temperature readings, money amounts, map coordinates, or phone numbers, which indicate transmission of machine-generated data, advantageously the invention at this stage focuses on recording the fact that these data formats have occurred in the event content as opposed to recording the actual information stored in such fields, (although in an alternative embodiment the actual information can be recorded too for use at a later stage) as the actual values can differ from event to event (for example message) but the occurrence of such characteristics/data formats in independent events can be predictive event features. In this embodiment the single event features are stored in the event store.

Per Device Feature: Event Content Abstraction.

In the second stage the invention extracts the events off the traffic stream and collates them by sender in order to derive per-device features. Here the invention calculates any statistics which refer to multiple events from the same source. The invention calculates aggregations of each of the single-event features extracted in the first stage. For each feature the mean and standard deviations are calculated (higher-order statistical moments are also calculated). Therefore for a given sender device, characteristic profile features can be calculated and known, for example, the average message length, average number of keyword occurrences, proportion of occurrence of timestamps, etc. The expectation is that over time M2M senders will exhibit stable, predictable message features with low variation.

As part of event content abstraction for each device the invention extracts the total vocabulary of the event content of the events which were sent by the requisite device. For this it retrieves the event content from the event store, as shown in FIG. 2. For each such event the content is tokenised into words, that is, the textual content of the event is split on whitespace and punctuation, leaving a list of words. For each word the invention calculates its frequency per message. The invention computes the total vocabulary of all messages sent by the device, as well as the average frequency of each word per message. This distribution of word frequencies acts as a signature for the text of messages sent by the device. The extracted data, metrics and associated computations are stored in the device information store.

Each aggregate event feature is computed as an intermediate result which is assimilated into an overall set of statistical moments for that device.

In this embodiment the event content abstraction features are stored in the device information store.

Note in an alternative embodiment the event content abstraction features are stored in an event meta store (not shown in FIG. 2), with a subset of these features being forwarded to the device information store, and other features being accessed directly from the event meta store on demand, which in some instances may be more efficient than re-computing aggregation features for single event features from the event store.

Per Device Feature: Temporal Statistics

The invention also calculates temporal statistics (refer to previous description of temporal sending patterns) which describe each device's traffic patterns, based on the timestamps of the events sent by that device. The invention computes the frequency of sending events across the time period, subdivided into bins of events, measured in events per second. Additionally the invention calculates temporal statistics for M2M Command and Control centres sending patterns to devices, such as temporal communication messages (for example SMS wakeup messages).

The invention additionally performs a more fine-grained temporal pattern analysis using the inter-event interval (IEI), measured as the timestamp difference between two consecutive events sent by the same device. If a device d sends n events ($e_0 \ldots e_{n-1}$) in a time period, and ts(e) represents the timestamp of the event e, then the set of inter-event intervals for d is:

$$IEI_d = \{t : t = ts(e_i) - ts(e_{i-1})\}; \text{ with } 1 \le i \le n-1$$

$IEI_d$ is the set of the intervals between the timestamps of each pair of consecutive events which were sent by the device d. From this certain metrics can be computed:

Variance-to-mean ratio (VMR) is computed from the mean and the variance of the set of IEIs for a device:

$$VMR_d = \frac{\sigma^2}{\mu}$$

VMR=0 implies a perfectly regular sending pattern, independent of the actual frequency of sending events. Higher VMR means less regularity.

Standard deviation and kurtosis of the IEI describe the shape of the distribution of IEIs. A sender with low standard deviation and high kurtosis is highly regular, because IEIs are all within a very tight bound.

From the sending frequencies (which are persisted for configurable time windows), the overall sending frequency for the device is calculated. The invention also uses the same series of frequency values to compute the autocorrelation coefficient of the sending event signal, which is a further measure of regularity.

Each temporal statistic feature is computed as an intermediate result which is assimilated into an overall set of statistical moments for that device.

The temporal features are stored in the device information store.

Per Device Feature: Numbering Characteristics

Since many M2M devices may be assigned in blocks, with for example operators such as an MNO bulk allocating dedicated IMSI ranges (MSISDN range allocation is also possible but IMSI range allocation is more likely), the invention uses this facet to learn normal traffic characteristic patterns for M2M devices based on for example the devices IMSI and how other devices which have IMSIs in the same range behave.

As regards obtaining the IMSI, this can be done by interrogating a HLR, which may be done in any event as part of device identifier validation (for example SMS MO spoofing).

In further detail as regards obtaining the IMSI if a Mobile originated (MO) SMS spoofing check is carried out (for example validation that the originator's sender identification (for example MSISDN) and VLR are valid) via for example an SMS interception/SMS Policy Enforcement Point (independently of or as part of a Network Protection and Policy System (or equivalent or similar) such as that provided by the Adaptive Mobile Security NPP (or equivalent or similar)), for example communicating with a HLR to establish that the VLR location stored in the HLR matches or is in the same range as the identification information in the MO SMS request (for example SCCP address in the MO SMS request), then the originator's IMSI is available from the HLR response to the SMS PEP and thus can be passed to the network security system and method of the invention, as illustrated in FIG. 2.

Further for a Mobile Terminated (MT) SMS, where a faking check such as destination MSC validation is carried out by the requisite SMSC, after which the MT SMS is intercepted by an SMS interception/SMS Policy Enforcement Point (independently of or as part of a Network Protection and Policy system (or equivalent or similar) such as that provided by the AMS NPP (or equivalent or similar)), and thus on successful MSC validation by the SMSC, the destination IMSI is available to the SMS PEP and thus can be passed to the network security system and method of the invention, as shown in FIG. 2).

If an SMS MO spoofing check or MT faking check has not been performed then the network security service of the invention can obtain the IMSI by for example interrogating an operator's HLR, directly or via for example an SMS interception/SMS Policy Enforcement Point (independently of or as part of a Network Protection and Policy system (or equivalent or similar) such as that provided by the AMS NPP (or equivalent or similar)), refer to FIG. 2. In some cases where the network supports it, the IMSI (for example A party IMSI) may be available with the message/communication event itself in the MAP layer. Advantageously for SMS the IMSI information is available per network communication event.

For IP, the source MSISDN would be available on device IP connection, with the network security service of the invention for example communicating with a Network Protection and Policy System (or equivalent or similar) such as that provided by the AMS NPP (or equivalent or similar) which communicates with a Radius Server on device IP connection, to obtain the MSISDN. An HLR lookup (as already described) is then performed to obtain the IMSI and the IMSI is made available to the network security system and method of the invention, as shown in FIG. 2.

Thus numbering characteristics (for example IMSI) capture and behavioural analysis is applicable to both SMS and IP, as also in the case of mobile IP a device uses numbering identification allocated by the operator.

Further, advantageously, identifying definitively particular devices as M2M devices allows the traffic patterns to and from such devices to be used to baseline normal reference traffic patterns for M2M devices, which can be used for detecting other M2M devices, whose numbering for example does not conform to a known allocated numbering range and thus cannot be definitively identified as an M2M device based on their numbering or other identification information, but whose behavioural patterns may conform to the behaviour of known M2M devices.

Further, if such identification information is available it can complement traffic patterns observed, for example in the case where the IMEI (International Mobile Equipment Identity) is obtained, the system of the invention can identify the device model type, the manufacturer, the date and country of approval, which allows the system to build and store (for example in the device information store) a more specific device profile, allowing correlation with known vulnerabilities, if they happen to be device specific. Other examples of identifiers worth noting here include ESN, MEID.

Identification information such as IMSI, IMEI, MSISDN, ESN, MEID etc are stored in the device information store or by other means. Thus for example advantageously, storing the IMSI enables IMSI block assignment detection, analysis of how other devices which have IMSIs in the same range behave and facilitates device grouping/clustering.

Also advantageously as with the other features, as well as in isolation such numbering characteristics can be analysed in combination with other features, for example in combination with one or more of the following (which are examples and non-limiting and have been already noted), namely, event content features, event content abstraction features, temporal/regularity metrics, network identifiers, location information, peer network patterns and group characteristics, etc. In the case of numbering characteristics this can advantageously complement for example further inference/detection of associated dedicated numbering ranges or other identification ranges, allowing inference/detection of further M2M devices. The numbering characteristics are stored in the device information store.

Per Device Feature: Network Identifiers

It can be expected that at least some operators have different infrastructure for their M2M and human traffic, and gravitate towards virtually or physically separate network node(s) (for example SMSCs), supplied either by the operator or an M2M MVNO or a mixture of both. Thus in the case of SMS, this constitutes at least one dedicated SMSC for M2M services (either supplied by the operator or an M2M MVNO or a mixture of both). Thus M2M traffic can use a different SMSC address(es), than the SMSC address(es) used for human traffic.

For Mobile Originated (MO) traffic the SMSC address is the Service Centre Address (SCA) which can be a virtual or real SCA, and/or the Destination SCCP address and this is available to the network security service of the invention via for example an SMS interception/SMS Policy Enforcement Point (independently of or as part of a Network Protection and Policy system (or equivalent or similar) such as that provided by the AMS NPP (or equivalent or similar)) intercepting the MO SMS (Refer to FIG. 2).

For Mobile Terminated (MT) traffic the SMSC address is the Service Centre Address (SCA) which can be a virtual or real SCA, and/or the source SCCP address and this is available to the network security service of the invention via for example an SMS interception/SMS Policy Enforcement Point (independently of or as part of a Network Protection and Policy system (or equivalent or similar) such as that provided by the AMS NPP (or equivalent or similar)) intercepting the MT SMS (Refer to FIG. 2).

In the case of IP, the address of the GGSN or APN if available can be extracted. Thus in one embodiment the APN is included in a network communication event (such as Packet browsing). The APN is for example added as an extended header into such HTTP communication, for example as X-APN and thus made available to the network security service of the invention.

In the case of the GGSN address (for a device associated with a network communication event) this can be made available, via the network security service of the invention for example communicating with a Network Protection and Policy system (or equivalent or similar) such as that provided for example by the AMS NPP or equivalent or similar, which communicates with a pertinent Diameter/RADIUS enabled network entity to obtain the associated GGSN address (refer to FIG. 2).

Note the GGSN address may be available for example as an IP v4 address (refer to 3GPP-GGSN-Address in 3GPP 29.061), an IP v6 address (refer to 3GPP-GGSN-IPv6-Address in 3GPP 29.061), or the MCC and MNC of the network the GGSN belongs to (refer to 3GPP-GGSN-MCC-MNC in 3GPP 29.061).

In the future for example for LTE/LTE-Advanced the same parameters can be used for the PDN gateway (PGW) address (refer to the same references given for the GGSN address).

The invention can use the presence of network identifiers such as those outlined above to learn normal traffic characteristic patterns for M2M devices, and these can be used as part of the criterion for establishing that a device is an M2M device or not.

The network identifiers are stored in the device information store.

Per Device Feature: Location Information

If location information is available, the invention stores the location information and records whether the device location is static or changing in the device information store. Thus for MO for example in some cases the Cell-ID may be available within the protocol fields, (which may include proprietary changes and modifications to standard protocol fields, for example to standard GSM protocol fields in standard protocols such as 3GPP TS 29.002, Mobile Application Part (MAP)), and provides device location information such as for example the Cell-ID of the Base Transceiver Station (BTS) with which the device communicated, to send the SMS. Thus for example the Cell-ID can be placed inside a GSM MAP protocol Extension container. If the Cell-ID is in an event intercepted by the SMS interception/SMS Policy Enforcement Point (independently of or as part of a Network Protection and Policy Protection system (or equivalent or similar) such as that provided by the AMS NPP (or equivalent or similar)), it can be passed to the network security service of the invention (refer to FIG. 2).

In addition for a Mobile originated (MO) SMS, the serving MSC/VLR address of the device which originated the message is available. In the case where an SMS spoofing check (for example validation that the originator's sender identification (for example MSISDN) and VLR are valid) is carried out via for example an SMS interception/SMS Policy Enforcement Point (independently of or as part of a Network Protection and Policy Protection system (or equivalent or similar) such as that provided by the AMS NPP (or equivalent or similar)), for example communicating with a HLR to establish that the VLR location stored in the HLR matches or is in the same range as the identification information in the MO SMS request (for example SCCP address in the MO SMS request), resulting in successful SMS originator validation, then the approximate location of the originating device (region/city associated with the MSC) is available to the SMS PEP and thus the serving MSC/VLR address of the originating device can be passed to the network security service of the invention (refer to FIG. 2).

Also in the case for a Mobile originated (MO) SMS, where an SMS spoofing check has not been carried out, but the originating SCCP Global Title (GT) can be trusted (i.e. in this instance the serving MSC/VLR address of the device which originated the message can be trusted), then as above the approximate location of the originating device (region/city associated with the MSC) is available to the SMS PEP and thus can be passed to the network security service of the invention (refer to FIG. 2).

Further for a Mobile Terminated (MT) SMS, where a faking check such as destination MSC validation is carried out by the requisite SMSC, after which the MT SMS is intercepted by for example an SMS interception/SMS Policy Enforcement Point (independently of or as part of a Network Protection and Policy system (or equivalent or similar) such as that provided by the AMS NPP (or equivalent or similar)), and thus on successful MSC validation by the SMSC, the validated destination MSC is available to the SMS PEP and thus can be passed to the network security service of the invention (refer to FIG. 2). Thus the approximate location of the device (region/city associated with the MSC) for which the MT SMS is intended is available to the network security service of the invention.

Advantageously for MO and MT SMS, the location information is available per network communication event.

Location information (for example device GPS co-ordinates) can be available to the network security service of the invention, in network communication events which are made available via the network probe (either with or without a network tap being required, refer to section data capture and records/statistics generation).

Further for IP, location information such as the SGSN address (for a device associated with a network communication event) can be made available, with the network security service of the invention for example communicating with a Network Protection and Policy system (or equivalent or similar) such as that provided for example by the AMS NPP (or equivalent or similar), which communicates with a pertinent Diameter/RADIUS enabled network entity to obtain the associated SGSN address which as in the case of MSC address provides an approximate location for the device (refer to FIG. 2).

Note the SGSN address may be available for example as an IP v4 address (refer to 3GPP-SGSN-Address in 3GPP 29.061), or an IP v6 address (refer to 3GPP-SGSN-IPv6-Address in 3GPP 29.061). Also pertinent MCC and MNC details may be available (refer to 3GPP-SGSN-MCC-MNC in 3GPP 29.061).

In the future for example for LTE/LTE-Advanced, the same parameters can be used for the Serving Gateway (SGW) address (refer to the same references given for the SGSN address).

In alternative embodiments the network security service of the invention independently or via a Network Protection and Policy system (or equivalent or similar, such as that provided by the AMS NPP (or equivalent or similar)), communicates with a Location Based Services (LBS) network element to query the location of a device by providing for example a device identifier (such as a MSISDN etc).

The location information is stored in the device information store.

Peer Network Patterns

From the captured and extracted network events for which the device is an actor (either a sender or recipient), the invention derives the third set of features, namely the peer network model (refer to peer network patterns sub-section in the Analysis model section and FIG. 2). This describes the device's activity in terms of the patterns of interaction with the devices it communicates with. For the purposes of this processing stage the invention considers network events to be of the form e=(s,r), in other words the event is a relation which holds between a sender s and a recipient r. The invention does not at this stage of the processing consider the event content (although event content may be considered at a later processing stage). For a device d, the following first-degree metrics are extracted, that is, those which only consider events for which d is either the sender or recipient:

The set of recipient peers of d, in other words the set of devices to which d has sent at least one event. For the purposes of the invention this is referred to as rp(d):

$$rp(d) = \{c: \exists e = (d,c)\}$$

The number of unique recipients, sizeof(rp(d)). This will typically be small for M2M devices, since they will communicate mostly with a small number (possibly 1) of control devices (for example an M2M command and control centre(s)).

The average and standard deviation of the number of events sent to each recipient.

The proportion of answered events. An event e is answered if the recipient of e subsequently sends an event back to the original sender of e:

$$\text{answered}(e=(s,r)) \equiv \exists e_a = (r,s) \cdot ts(e) < ts(e_a)$$

In other words there must exist an answering event $e_a$ in which the sender and recipient roles are reversed. The invention records the overall proportion of answered events to total events which the device sent as follows:

$$\frac{|\{e = (d, \_).\text{answered}(e)\}|}{|\{e = (d, \_)\}|}$$

This can be a potential differentiating factor between M2M devices and human-controlled devices.

Ratio of sent to received events. The invention computes the sets of sent and received events for the device in question:

$$\text{sentBy}(d) = \{e: e=(d,\_)\}$$

$$\text{recdBy}(d) = \{e: e=(\_,d)\}$$

The invention records the smoothed log ratio of the number of sent events to the number of received events:

$$\text{sentRecLogRatio}(d) = \log\left(\frac{|\text{sentBy}(d)| + 1}{|\text{recdBy}(d)| + 1}\right)$$

The +1 term is introduced to smooth the values so that there are no log(0) or divide by zero errors. The log function centres this metric at zero, and devices which send and receive the same number of events will have a log ratio of zero. Net senders have positive values and net recipients have negative values. M2M devices have a highly positively skewed log ratio.

The extracted metrics and associated computations are stored in the device information store.

Second-degree Features (Group Characteristics).

The invention also computes a number of second-degree features (which can be based on events from the entire event store), namely those which model the sending patterns of the peers of d (refer to group characteristics sub-section in the Analysis model section and FIG. 2).

The number of recipient peers of d who communicate with each other. In human peer networks, the recipients of a single sender will tend to communicate with one another to a certain degree. In machine peer networks this is less the case. The invention records the number of unique devices a and b which are in the recipient set of d and which communicate with one another (either an event is sent from a to b or from b to a):

$$|\{a,b \cdot a,b \in rp(d) \wedge a \neq b \wedge \exists e \cdot (e=(a,b) \vee e=(b,a))\}|$$

Whether the device d communicates with a controller-like device. A device c is likely to be an M2M controller device (for example an M2M command and control centre) if all devices s which send to c only send to c. In other words the invention tests whether, for all devices other than c, if there is some sending event to c from that device, then c is the only device that it sends to:

$$\text{isControlDevice}(c) \equiv \forall s \neq c \cdot [(\exists e \cdot e = (s,c)) \Rightarrow rp(s) = \{c\}]$$

If d communicates with such a controller-like device, then d is likely to also be an M2M device.

The invention records the average number of recipient peers, rp(s), for all devices s which send to a device d. If this average is close to or exactly 1, then d is the only device which each of them communicates with, so d is likely to be an M2M controller.

To reflect changes in the devices sending and receiving patterns, and as feature values are updated (and stored in the device information store) as a result of new events from the traffic stream, the peer network model is rebuilt periodically so that the second degree features can be periodically recomputed and kept up to date and stored in the device information store.

M2M Detection Analysis

Figure 3:
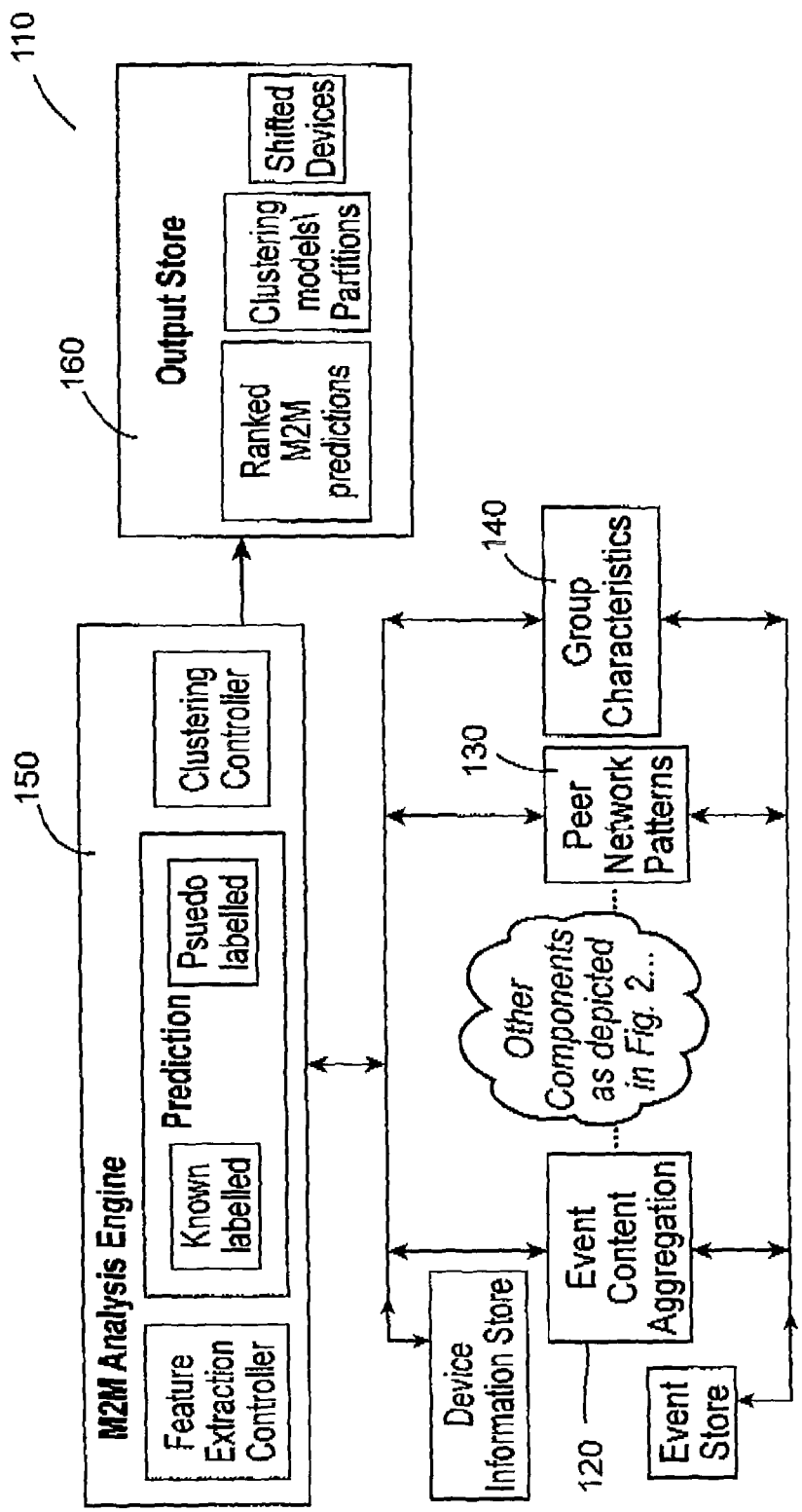
FIG. 3 illustrates a number of components of the M2M Analysis Engine and high level analysis model information flow according to one embodiment of the invention.

FIG. 3 illustrates a number of components of the M2M Analysis Engine and high level analysis model information flow according to one embodiment of the invention.

When feature extraction and derivation is completed, a full set of measures of the relevant patterns which describe each device's network behaviour is available in the device information store, as shown in FIG. 2 and FIG. 3. M2M detection analysis is applied to this data store. In one embodiment the analysis proceeds in three stages, with differing degrees of confidence that can be attached to their outputs: prediction from known M2M device patterns, prediction from suspected M2M device patterns, and clustering of all device patterns. Each kind of analysis takes place on an on-going basis so that results are updated in response to new information becoming available in the device information store.

Prediction from Known M2M Patterns

If there are some devices in the device information store which are known to be M2M devices, then their patterns can be used to predict whether other devices are M2M. These patterns have either been discerned from device communications or other information which the invention captures from the network, and may be realised as a set of dynamic pattern rules or some other suitable model.

This is a traditional supervised learning problem, whose solutions are well known in other arts. The labelled instances (refer to "known labelled" in FIG. 4) are the patterns of those devices which are known to be M2M devices. The invention dynamically determines the best features each time it performs the task of constructing a model of M2M behaviour in order to categorise the remaining devices into M2M and non-M2M.

Figure 4:
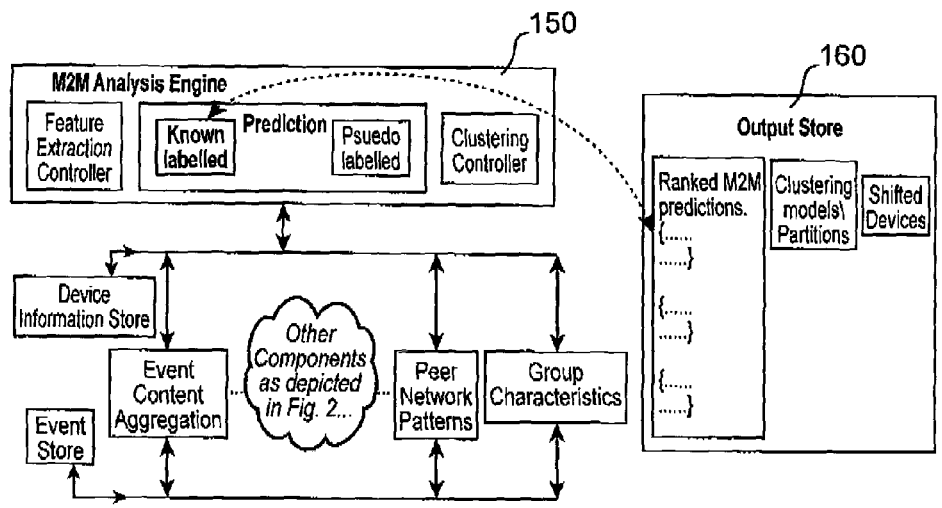
FIG. 4 illustrates the M2M analysis engine for prediction using known labelled M2M patterns and output with reference to the overall predictions.
Figure 5:
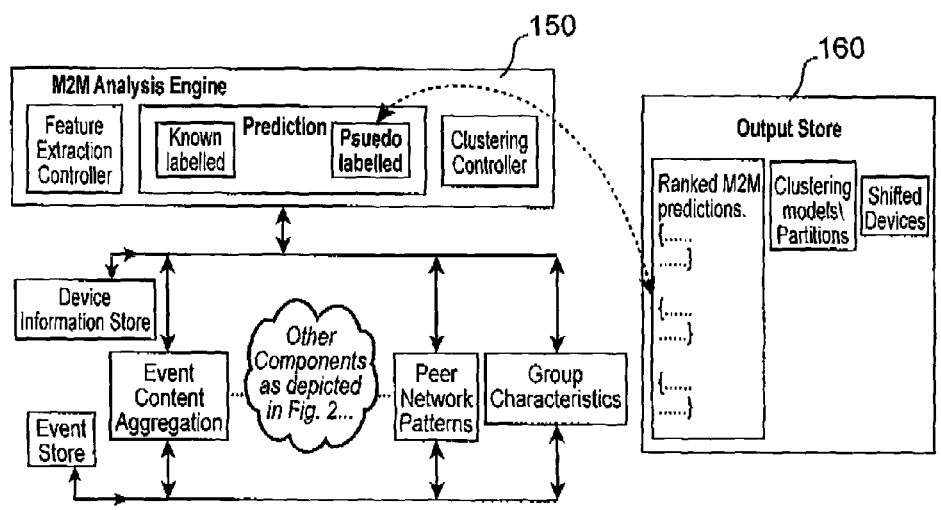
FIG. 5 illustrates the M2M analysis engine for prediction using pseudo-labelled (suspected) M2M patterns and output with reference to the overall predictions.

The device behaviour pattern is modelled as a feature vector containing each of the (available or discernible) features described in the preceding sections. In one embodiment the Logistic regression algorithm is applied to determine whether the remaining unlabelled instances can be categorized as M2M devices or not. Although logistic regression may provide the best approach as the features are likely to be mainly continuous real-valued, in alternative embodiments alternative machine learning algorithms can be applied such as for example some variant of naïve Bayes. The output of this analysis is a set of devices which are classified as being M2M, along with a confidence score for this classification. All classifications can be accepted or alternatively only the most highly ranked reported as ranked M2M predictions, where ranking is based on the confidence score (as shown in FIG. 4). The ranked M2M predictions can for example be displayed via the Analyst Toolkit (UI).

Prediction from Suspected M2M Patterns

If there are no "known labelled" i.e. positively identified M2M devices in the records, then supervised learning is still applied to predict M2M devices as in the previous analysis. The difference is that in the absence of labelled data, seed labels are provided to the analysis by identifying those devices whose patterns are most like M2M, i.e. most machine-like sending patterns, for instance, those devices exhibiting patterns which for example have a combination of one or more of the following (which are examples and non-limiting), namely, event content features, event content abstraction features, temporal sending patterns, numbering characteristics, network identifiers, location information, peer network patterns and group characteristics.

In one embodiment, feature abstraction is used to identify those devices most likely to be machines. Since each feature value is continuous real-valued, devices are stratified along each dimension of the feature vector in order to identify the extreme values. If a device for example is in the highest bracket for a combination of one or more of the following (which are examples and non-limiting), namely, content features, temporal features, numbering characteristic features, network identifier features, location information features, peer network features and group characteristics, it is considered to be a pseudo-labelled instance of an M2M device, and supervised learning with the labels as described above is used. In alternative embodiments other methods to determine appropriate brackets are used which can include for example unsupervised learning, explicit cut offs and explicit percentiles.

Grouping Traffic Patterns by Clustering

Whether there are known M2M devices or not, groups of devices which have for example a combination of one or more of the following (which are examples and non-limiting), namely, similar content, temporal, numbering characteristics, network identifiers, location information, peer network patterns and group characteristics are found by using clustering. Clustering is a form of unsupervised learning which attempts to group the elements of a population into a specified or unspecified number of clusters, grouping those elements which are most similar to each other. Groups of similar elements are typically found by examining the distance between their sets of feature values. Distance can be computed using the Euclidean distance function between feature vectors of two elements. Clusters may be constructed based on density or the maximum distance between pairs of elements, or they can be constructed hierarchically by combining small clusters into larger ones. The result of clustering is a partition of the input into non-overlapping subsets (with a partition being the set of all devices being analysed/under consideration of the invention at a particular time), and the goodness of this partition can be measured using standard metrics (for example by applying the Dunn index which aims to identify dense and well-separated clusters).

The output of the clustering analysis is a set of clusters of similar devices, and for each cluster a model of its typical patterns. Every device will be contained in some cluster, although it should be expected that there are singleton clusters containing devices whose behaviour is not similar to any others. In contrast to human-controlled devices which should be widely distributed in many smaller and possibly singleton clusters, M2M devices should appear in clusters which are large, more dense and more self-similar. Those clusters whose typical patterns are most machine-like are identified by the invention. The invention also explicitly stores the cluster to which an arbitrary device belongs.

From each cluster a general characterisation of the patterns that the devices in it share can be extracted, for instance that the regularity measure is on average in a certain range, or that most elements of the cluster send to a similar number of peers. The density of a cluster is also measured, based on the number of elements and the maximal pairwise distance between feature vectors across all cluster members, which gives an indication of how self-similar the elements of the cluster are. Denser clusters are more likely to be M2M devices, since for example algorithmically controlled devices are more similar to each other than any set of similar non-machine devices.

As part of event content abstraction (refer to previous sub-sections on event content abstraction in analysis model section and in feature extraction and derivation section), the invention extracts the requisite vocabulary data, metrics and associated computations and stores them in the device information store. For each cluster the invention can thus extract the total vocabulary of the event content of the events which were sent by devices in the cluster. To achieve this the invention retrieves from the device information store, for each device in the cluster, the per device tokenised vocabulary data, metrics and associated computations as described in sub-section on event content abstraction in feature extraction and derivation section. For each word the invention calculates its frequency per message for all messages sent by all devices in the cluster. The invention then computes the total vocabulary of all messages sent by devices in the cluster, as well as the average frequency of each word per message. This distribution of word frequencies acts as a signature for the text of messages sent by the devices in the cluster.

The vocabulary of a human-originated message is typically a sample from a large set of human-language dictionary words. The sum of word frequencies across a large number of clusters results in a power law distribution which is typical of natural language. Machine-generated messages however diverge strongly from this pattern. They use a smaller total vocabulary, more punctuation, and non-dictionary words. Additionally the vocabularies of devices in a single cluster are more self-similar than a non-M2M cluster vocabulary.

Thus in addition to the methods already outlined that the invention employs to differentiate M2M devices from human devices, the invention also uses the vocabulary of a cluster to determine whether it is machine-generated by first measuring its divergence from the overall vocabulary of the event store. If the average frequencies of words in the cluster vocabulary show a different distribution to the overall vocabulary, then the cluster in question is likely to be non-human-generated content. Further, the invention measures the internal self-similarity of the cluster vocabulary, which is highly self-similar if the variation of the frequency of each word is low compared to other clusters. Most advantageously, the invention can perform this analysis, without it being necessary to specify the language of the human-generated content or to specify a dictionary of words.

Figure 6:
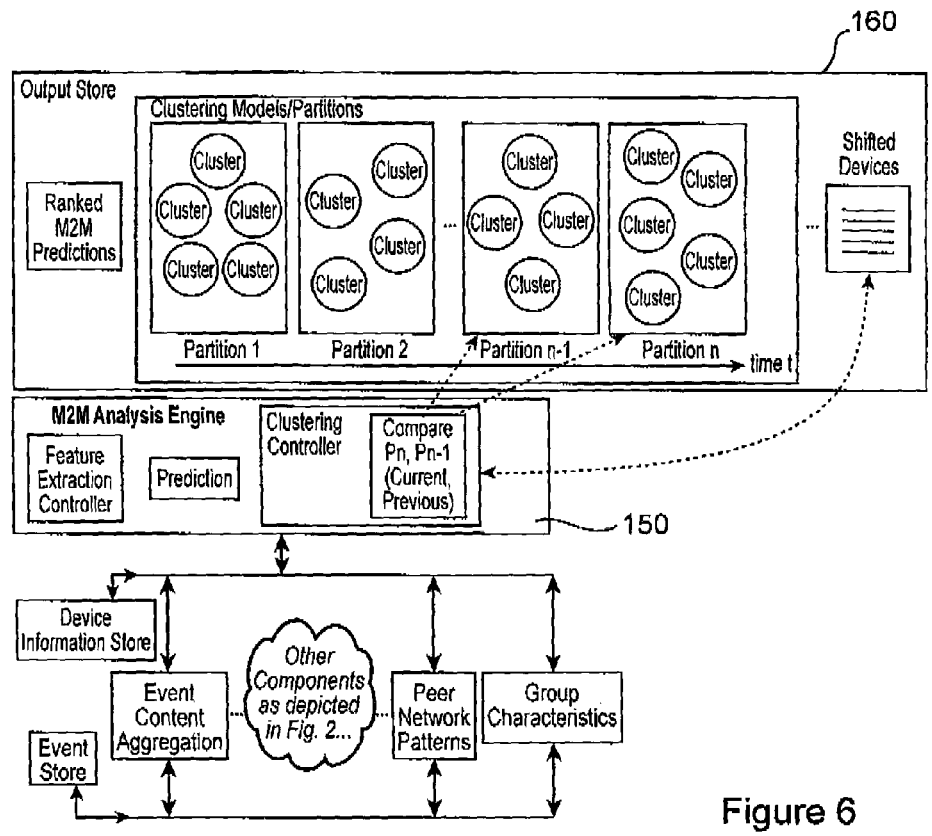
FIG. 6 illustrates grouping of traffic patterns by clustering according to one embodiment of the invention.

As shown in FIG. 6, the invention periodically repeats the clustering analysis, so that a sequence of partitions over time is generated. From this output the invention provides the function cluster_of (d, $p_n$) to access the cluster which a device d is an element of in the partition $p_n$, where $0 \leq n \leq t$. It also provides a function centroid_of (clu,$p_n$) to retrieve the centroid, or average element, of the cluster clu in the partition $p_n$.

The network security system and method of the invention having analysed and established traffic patterns corresponding to normal characteristic patterns associated with M2M device activity (including communication with M2M command and control centres), can detect and analyse out of the ordinary communication patterns associated with M2M device activity, as described in the following sections.

Pattern Shift by Membership Change

For M2M devices, whose patterns should be quite regular and predictable, a significant shift in patterns indicates that the device's behaviour has changed. The invention has the ability to detect when the behaviour of a device is suddenly altered. Having identified normal traffic characteristic patterns and grouping these patterns by clustering, the invention can effectively then use these patterns as baseline or control signature patterns for detecting patterns of behaviour which deviate from these normal behavioural patterns.

Periodically the invention examines the latest partition of the device population which has been derived by clustering, as shown in FIG. 6, focusing on those clusters which it has determined are most likely to be M2M clusters. In each such cluster, the invention computes a distance for each device to the rest of its cluster. Possible distance measurements for a device include the average distance from it to all of the other members of the cluster, or the distance from it to the centre of the cluster. The invention uses the following function to compute this distance from a device d, to a cluster c containing m devices within the partition $p_n$ using the average distance to other members:

$$dist(d, c, p_n) = \frac{1}{m-1} \sum_{s \in c \setminus \{d\}} dist(d, s, p_n)$$

For this calculation the cluster is treated as a simple set of devices, and the distance between two devices d and s is calculated using the Euclidean distance function dist (d, s, $p_n$).

If the distance between a given device and its cluster rises sharply between two consecutive partitions, it means that the device in question has moved away from the devices it had previously been in the same cluster as. The invention determines whether the device has moved so far that it has left its cluster by examining the average pairwise distance between all devices in the cluster. Using the definition of distance above, the average pairwise distance of a cluster c is defined as the average distance of each device d in the cluster to the rest of the cluster, in the context of the partition $p_n$:

$$avgPairwDist(c, p_n) = \frac{1}{|c|-1} \sum_{d \in c} dist(d, c, p_n)$$

The invention uses this measure to test whether a given device is within a cluster:

within(d, cluster, $p_n$) $\Leftrightarrow$ dist(d, cluster,$p_n$)$\leq k$*avgPairDist(cluster\{d})

This states that the device d is within a cluster if and only if its distance to the cluster is less than or equal to the average pairwise distance of the cluster, multiplied by a factor k. The multiplier k accounts for the fact that some devices in the cluster have a higher distance to the other devices, and it acts as a measure of how far from the cluster the device d may lie and still be considered as being within that cluster. The invention uses a multiplier which is in proportion to the standard deviation of the pairwise distance of the cluster:

$$k = \alpha * \text{stddev}(\text{dist}(d,c,p_n)) \text{ for all } d \in c$$

The coefficient $\alpha$ in this embodiment can for example be set to $\alpha=3$, which equates to the device d being significantly far outside a normally distributed cluster. The invention detects a pattern shift by testing the following predicate:

$$\text{shifted}(d,p_n) \Leftrightarrow \ulcorner \text{within}(d, \text{cluster\_of}(d, p_{n-1}),p_n)$$

This predicate is a test which compares the contents of two consecutive partitions of the device population. It states that a device has shifted out of its cluster in partition $p_n$, if and only if it is not within the cluster which it was a part of in the previous partition $p_{n-1}$. Such a shift can only be caused by a large change in at least one, but probably many, of its feature values, which the invention deduces as likely to be as a result of unusual and suspicious change in behaviour.

Figure 7:
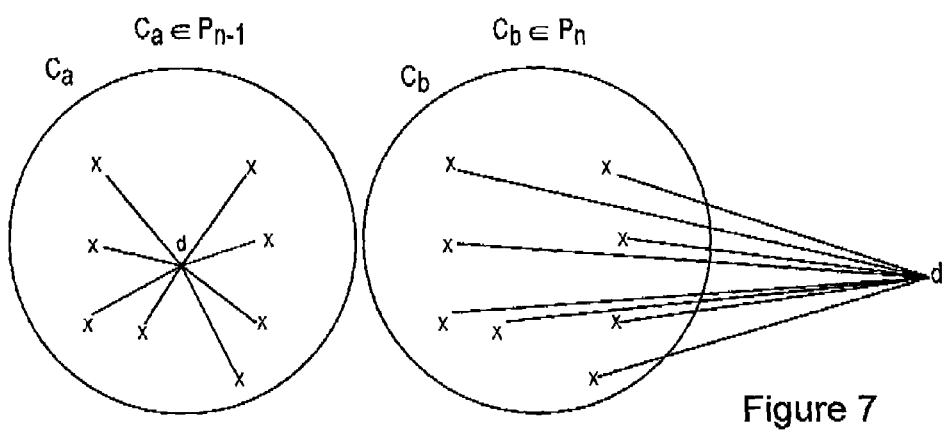
FIG. 7 illustrates a device shift between successive partitions shown in the embodiment of FIG. 6.

The test for shifted devices is illustrated in FIG. 7. In the time between the generation of the successive partitions $p_{n-1}$ and $p_n$, the device d has moved away from the other devices (illustrated with x in the diagram) in the cluster $c_a$, which it had been a member of. In $p_n$ the distances of d to each of these devices is larger than before, and therefore the distance to the cluster is larger. The maximum distance between the devices other than d however remains the same since they have not moved with respect to each other. The invention concludes therefore that d is no longer within the cluster it was previously a part of based on the definition above, in other words it has shifted out of that cluster in the context of the partition $p_n$.

Importantly this method of detecting changes does not require an absolute rise or fall in the value of any feature to be deemed suspicious, instead the invention is able to recognise changes in a device's behaviour using only its relationship to other elements of its cluster.

Pattern Shift by Re-clustering

The behaviour of groups of M2M devices may change quite normally over time, albeit in smaller steps than would be observed in the case of a malicious intervention. To detect a single device changing its pattern abruptly in the context of natural, gradual change of its group, the clustering analysis described in the previous section is repeated at appropriate regular intervals as shown in FIG. 6. The new set of clusters is then compared with those found on the previous iteration. If there is a device which is no longer a member of the group it was previously a member of (a pattern shift), this indicates that this device has radically changed its behaviour pattern with respect to those to which it was previously most similar. Each such M2M device for which the previous cluster contained M2M devices is reported (c.f. FIG. 6, shifted devices), as a device which has undergone behavioural change or intervention, which may be suspicious. Multiple devices which have moved from the same cluster to the same new cluster are deemed to have undergone the same behavioural change or intervention. The benefit of detecting behavioural shifts by clustering is that the degree or direction of the shift does not need to be specified a priori, instead the significance of the shift is measured with respect to the boundary of the cluster which the device was previously a member of.

Output

The results of each of the three M2M prediction methods outlined in the previous sections are combined into a confidence-ranked list of devices which the system has identified. The highest ranked are those predicted from known M2M devices, next most confident are those predicted from pseudo-labelled instances, and finally those predicted from device clustering are listed. Separately the system outputs its model of M2M behaviour derived from the clusters which contain known M2M devices, as well as the M2M devices which have shifted their behaviour recently.

Analysing M2M Device Behaviour which has Changed Markedly.

Having detected as described above that an M2M device's behaviour has changed dramatically, the invention analyses such behaviour to ascertain if the behavioural change can be classified as benign or not. Analysis is performed to ensure that the behavioural change is not due to benign occurrences which can cause the device to behave differently from its previous behaviour. The invention recognises benign changes in a device when the entire cluster which the device is a member of shifts. In this case a systematic change has taken place across all devices in the cluster, which indicates that the change is unlikely to be due to malicious intervention. A non-exhaustive list of possible causes of this includes:

redeployment, which can for example be that the devices have moved to a different network operator (as already described M2M devices can have multi tenancy i.e. multiple SIMs (for multiple operators), cf. section identification of M2M devices from numbering information) in which case the devices in a cluster begin using different SIMs/IMSIs. On migration to another operator network, if each device state remains stable as regards features that are being analysed (with the exception of numbering characteristics and network identifiers), and if the devices in question are redeployed around the same time, this migration to another operator network can manifest itself as all devices which were in clusters together in the same partition remaining clustered together in a future partition (albeit with changed numbering characteristics) and thus the invention can deem such to be likely to be benign. In alternative preferred embodiments a device may retain at least one unique identifier such as an IMSI or MSISDN. In an embodiment where the IMSI is retained as the device unique identifier, the device may for example have multiple MSISDNs.

network reconfiguration, within the same operator which can be indicated for instance by a change in location information (for example for IP a change in the SGSN address) or a change in network identifiers (such as SMSC address) associated with the devices in a cluster and their network traffic.

device reconfiguration, shown for instance by change in the event content features after a software upgrade.

a malfunction, for example shown by inactivity, or a drop in sending frequency of the device, or ageing.

or a natural change in the devices' environment, shown for instance by a rise in temperature readings which the devices transmit.

In general, the invention considers full-cluster shifts to be signs of natural, benign change in the device population.

Having ruled out changes in behaviour which are benign in nature, the invention analyses remaining behaviours to ascertain if they pose a security or other threat or signify malicious activity. Thus out of the ordinary communication/traffic patterns associated with M2M device activity (with such communication/traffic patterns including both to and from M2M devices, and to and from other parties such as M2M Command and Control Centres) are analysed.

The following is a non-exhaustive list of potential signs of marked changes which indicate suspicious changes to device behaviour which the invention analyses. These changes tend to be changes in device behaviour in the context of their clusters, that is, which show divergence from the behaviour of other devices in the cluster. The invention can analyse one or more of the following (or other criteria not detailed here) in isolation or combination.

- Communication outside the group may be deemed to be very suspicious as in general outside third parties should not be aware that the M2M devices or their requisite command and control centres exist. So communication by an M2M device within an M2M group with other parties outside the M2M group (other than the requisite command and control centre which can generally be considered to be inside the M2M group) should not be necessary or expected. Also communication by the M2M group's requisite command and control centre with parties outside the M2M group with which it is not usually in communication with, should not be necessary or expected.
- Thus on analysis of devices which exhibit pattern shift by re-clustering as described above, if one or more such devices shift from inside a particular cluster because they have suddenly started communicating with another command and control centre, but the remaining members of the group/cluster continue to communicate with the original command and control centre, that is suspicious, and advantageously can lead to malware infection detection as it may be an indication that those devices have been compromised by malware, for example been infected with bot malware.
- Typically M2M devices do not generally exhibit peer communication with other M2M devices (i.e. communication is normally with the M2M command and control centre, refer to previous sub-sections on peer network patterns in analysis model section and in feature extraction and derivation section), so such communication would also be suspicious. Again this advantageously can lead to malware infection detection as such behaviour changes can be as a result of malware infection.
- Referring to event content and aggregated event content features (refer to previous sub-sections on event content and event content abstraction in analysis model section and in feature extraction and derivation section), any change for example in the average length of the messages the device sends, or the M2M keywords or distribution of encoding characters in its messages, would indicate that the protocol (for example ad-hoc protocol) which the device is using has been replaced or overwritten. A change or addition for example to the occurrences of known data formats such as dates and times would indicate that the device has started transmitting different data. If one or more such devices shift from inside a particular cluster because their event content or aggregated event content features have suddenly deviated from what they were before, but the remaining members of the group/cluster continue to communicate exhibiting the original patterns, then this is suspicious and advantageously can lead to malware infection detection as it may be an indication that those devices have been compromised by malware, for example been infected with bot malware.
- Referring to vocabulary, if for example the average frequencies of words in the vocabulary a device uses suddenly shows a different distribution to the cluster vocabulary (i.e. a cluster which by its vocabulary profile has already been identified as likely to be a cluster pertaining to M2M devices), and/or if the vocabulary an M2M device uses, suddenly begins to deviate from internal self-similarity of the cluster vocabulary to which the device hitherto belongs, then this constitutes an unusual and potentially suspicious event.
- Referring now to temporal statistics which are derived for each device, if there is a sudden change in temporal communication patterns such as for example the frequency or burstiness of sending or receiving events for that device, then the invention can conclude that an usual and potentially suspicious intervention in the device's behaviour has occurred.
- Referring now to analysis of location specific information and notwithstanding that there are M2M devices (such as vehicular M2M devices) which clearly can be expected to be exhibiting different location information, but if on analysis of location information (for example for M2M devices which exhibit pattern shift by re-clustering), M2M devices which had heretofore been stationary suddenly provide different location information this would constitute an unusual and potentially suspicious event. Examples of location specific information as already discussed (refer to the location information sub-sections in analysis model, and feature extraction and derivation section), include:
  - Cell-Id and MSC address (with Cell-Id providing more specific location granularity than MSC address), or in the case of IP location information such as the SGSN address.
  - location information (for example GPS co-ordinates) in network communication events which are made available to the network security service of the invention via the network probe (with or without a network tap being required, refer to section data capture and records/statistics generation).
  - location information that is available by the network security service of the invention (independently or via a Network Protection and Policy system (or equivalent or similar) such as that provided by the AMS NPP (or equivalent or similar)), communicating with a Location Based Services (LBS) network element to query the location of a device.
- Referring now to analysis of numbering characteristics, such as for example IMSI, as already described (refer to numbering characteristics sections in analysis model, and feature extraction and derivation section), since operators may bulk allocate IMSI ranges to M2M devices in blocks, the invention can use this facet to learn normal traffic characteristic patterns for M2M devices based on for example the devices IMSI and how other devices which have IMSIs in the same range behave. If having established that a device with an IMSI in a particular range is an M2M device and then subsequently the M2M device exhibits pattern behavioural changes detected by re-clustering (which can be different to behavioural patterns of other devices in the same IMSI range), the invention analyses such behaviour to ascertain if it poses a security or other threat or signifies malicious activity.
- Referring now to analysis of network identifiers such as SMSC address which can be for example Service Centre Address (SCA) which can be a virtual or real SCA, and/or the Destination SCCP address (MO) or the source SCCP address (MT) (refer to the network identifiers sections in analysis model, and in feature extraction and derivation section), once it has been established by the invention that a particular SMSC(s) is associated with/dedicated to M2M traffic, then normal traffic from M2M devices would be expected to contain such SMSC addresses. If on analysis by the invention of such network identifiers it is established by the invention that one or more M2M devices suddenly begin using different network identifiers than heretofore (but the remaining members of the group/cluster continue to communicate with the original SMSC(s)) this constitutes an unusual and potentially suspicious event. If however the majority of M2M devices in a particular cluster migrate to a different SMSC, this might be due to reconfiguration, for example a new SMSC being brought into production etc Referring now to analysis of network identifiers for IP such as the address of the GGSN or APN if available to the network security service of the invention. Once it has been established by the invention for example that a particular APN is normally used by/dedicated to M2M devices, then normal traffic from M2M devices would be expected to contain such an APN (for example extended header X-APN). If on analysis of such network identifiers it is established that one or more M2M devices suddenly begin using a different APN than heretofore (but the remaining members of the group/cluster continue to communicate using the original APN) this constitutes an unusual and potentially suspicious event.

By the same token once it has been established by the invention that a particular GGSN (for example an M2M MVNO GGSN) is normally used by/dedicated to M2M devices, if on analysis of such network identifiers it is established that one or more M2M devices suddenly begin using different network identifiers than heretofore (but the remaining members of the group/cluster continue to communicate with the original network identifier, for example GGSN) this constitutes an unusual and potentially suspicious event.

If however the majority of M2M devices in a particular cluster begin to use a different APN and/or migrate to a different GGSN, this might be due to reconfiguration, for example a new GGSN or M2M MVNO GGSN being brought into production etc.

Having detected that at least one M2M device has been compromised, the invention applies effective methods to isolate the one or more compromised devices and neutralize any security threat that is posed. These methods are described below.

Network Service Quarantine

Network service quarantine can take the form for example of temporarily or indefinitely suspending services for an M2M device, which can take such forms for example as the network security service of the invention communicating with a Network Protection and Policy System (or equivalent or similar) such as that provided by the AMS NPP (or equivalent or similar), to perform policy control to for example block one or more services and/or associated traffic for an M2M device.

Thus network service quarantine can take the form of policy control such as for example blocking all or selective traffic (whether originated on the network or outside of the network) for one or more bearers or services (for example SMS, any IP traffic (including for example WEB, SMTP traffic etc), etc.) going to or from one or more entities (any of which can originate or terminate traffic), which may be identified by an identifier or address (which may be, but not limited to a subscriber identifier such as a MSISDN, MDN, IMSI or IP address, or a device identifier such as an IMEI, ESN, or MEID or a network identifier such as an IP address (and port), APN (Access Point Name), SCCP Global Title (GT) or Service Centre (SC) Address, Point Code (PC) and Sub System Number (SSN) etc.) or any combination of these or other identifiers or addresses, which can be achieved by for example with or without the network security service of the invention communicating with a network element such as a Network Protection and Policy system (or equivalent or similar) such as that provided by the AMS NPP (or equivalent or similar), which can be in conjunction with or not an SMS Interception/Policy Enforcement Point (which can be independent of or as part of a Network Protection and Policy System (or equivalent or similar) and may or may not be provided by AMS).

An example of such policy control is all or selective traffic (including traffic from an entity such as a device, for any destination entity, whether originated on the network or outside of it and any traffic going to the entity whether originated on the network or outside of it), for one or more bearers or services from/to an entity which is suspected of being a compromised M2M device (or a compromised M2M command and controller), being prevented from leaving an operator network, or being delivered in the operator's network to the suspected compromised M2M device (or compromised M2M command and controller).

Examples of destination entities include a particular URL or particular IP address and port which is (or suspected of being) a rogue command and control centre (i.e. other than a legitimate M2M command and control centre for the M2M device) or a particular device.

In alternative embodiments the network security service communicates with more than one network element to achieve policy control as described, such as a Network Protection and Policy system (or equivalent or similar) such as that provided by the AMS NPP (or equivalent or similar), in conjunction with at least one further network element, such as for example an SMS Interception/Policy Enforcement Point (which can be independent of or as part of a Network Protection and Policy System (or equivalent or similar) and may or may not be provided by AMS), a firewall, a Web Proxy, an operator's charging and rating system, etc.

Thus in one embodiment, network service quarantine can take the form for example of the network security service of the invention communicating with a Network Protection and Policy system (or equivalent or similar) such as that provided by the AMS NPP (or equivalent or similar), or the network security service in conjunction with a Network Protection and Policy system (or equivalent or similar, such as that provided by the AMS NPP (or equivalent or similar)) and at least one further network element (such as for example a Web Proxy, for example squid) blocking all or selective Web traffic, between any two or more entities, for example between a particular M2M device (identified for example by a subscriber identifier such as a MSISDN, MDN, IMSI, or IP address), and a website etc.

In an alternative embodiment, network service quarantine can take the form for example of the network security service of the invention communicating with a Network Protection and Policy system (or equivalent or similar) such as that provided by the AMS NPP (or equivalent or similar), in conjunction with a Web proxy service network element (for example squid) and a URL categorisation network service entity (for example a URL/WEB content categorization service/database such as provided by RuleSpace) blocking all or selective Web traffic, between any two or more entities for example between a particular M2M device (identified for example by a subscriber identifier such as a MSISDN, MDN, IMSI or IP address), and a website etc.

In a further alternative embodiment, network service quarantine takes the form for example of the network security service of the invention communicating with one or more network elements such as an operator's charging and rating system (either with or without a Network Protection and Policy system (or equivalent or similar) such as that provided by the AMS NPP (or equivalent or similar) being required), which prevents or restricts services/applications for the device. Service restriction can take the form of no communication being allowed for the M2M device, other than with a legitimate M2M command and control centre for the M2M device, which can be white listed, but no "credit" being extended for other communication or services.

In a further alternative embodiment, network service quarantine takes the form for example of the network security service of the invention communicating with a Network Protection and Policy system (or equivalent or similar) such as that provided by the AMS NPP (or equivalent or similar), to perform policy control on SMPP traffic between for example a VASP (or an SMPP inter carrier gateway) and an SMSC. Such policy control takes the form for example of blocking all or selective SMPP SMS traffic between any two or more entities for example between a particular M2M device (identified for example by a subscriber identifier such as a MSISDN, MDN, IMSI, or IP address), and a VASP service, or between an M2M device and any other entity other than a legitimate M2M command and control centre for the M2M device.

As can be appreciated the above are a non limiting set of examples with many more embodiments being possible.

Network Device Revocation or Network Device Quarantine

Network device quarantine or revocation can take the form for example of the network security service of the invention communicating with one or more network elements (either with or without a Network Protection and Policy System (or equivalent or similar) such as that provided by the AMS NPP (or equivalent or similar) being required) such as an operator's EIR (Equipment Identity Register) or a CEIR (Central Equipment Identity Register) to put an M2M device's IMEI (International Mobile Equipment Identity) on an EIR or CEIR greylist (for device quarantine) or blacklist (for device revocation), etc. denying service by the network (or all networks using the CEIR) to the M2M device. Advantageously the M2M device's SIM can be moved to another clean device in such an instance.

In an alternative embodiment, network device revocation or quarantine can take the form for example of the network security service of the invention communicating with one or more network elements such as the operator's HLR in the operator's network to indefinitely (revocation) or temporarily (quarantine) block an M2M device's SIM via blocking the IMSI.

In a further embodiment network device revocation can take the form for example of the network security service of the invention communicating with one or more network elements such as a mobile device management network element to perform a factory reset, restoring an M2M device to its factory settings, or other default settings etc.

Thus the invention, by having the ability to perform network service quarantine and network device revocation and quarantine, in addition for example to protecting critical M2M services can address such network security concerns and issues as for example excessive signalling or network requests, congestion or flooding concerns (for example flooding of a network or network element(s) with unwanted traffic in a flood/Denial of service attack).

As already described and equally applicable of course for network service quarantine, network device revocation or network device quarantine the network security service of the invention can interface with other network elements (which include for example one or more instances of Radius enabled network entity, Diameter enabled network entity, SIP enabled network entity, HSS, Location Based Services (LBS) network element, Web Proxy, Firewall, Charging and Rating network element, PCRF, URL categorisation service Update service, etc.) via a Network Protection and Policy System (or equivalent or similar) such as that provided for example by the AMS NPP (or equivalent or similar) however in alternative embodiments the network security service of the invention can communicate/interface to such network elements directly (or by other means), without a Network Protection and Policy System (such as that provided by the AMS NPP (or equivalent or similar)) being required).

Further the network security service of the invention can communicate/interface to other network elements (which include for example SMSC, HLR, EIR, CEIR, etc.) via a Network Protection and Policy System in conjunction with an SMS Interception/Policy Enforcement Point (which may or not be an AMS system), however in alternative embodiments the network security service of the invention can communicate/interface to such network elements via an SMS Interception/Policy Enforcement Point (which may or not be an AMS system) without a Network Protection and Policy System (such as that provided by the AMS NPP (or equivalent or similar)) being required or in a alternative embodiment can communicate/interface to such network elements (directly or by other means) without either a Network Protection and Policy System, or an SMS Interception/Policy Enforcement Point being required.

Also the Network Protection and Policy System (or equivalent or similar) need not be that provided by the AMS NPP (or equivalent or similar).

As can be appreciated the above are a non-limiting set of examples with many more embodiments being possible.

Further Aspects of the Invention

Advantageously the invention supports incident management. In one embodiment an incident manager is embodied as an overarching process that exists in combination with the Analyst toolkit and reporting module (see FIG. 2). The incident manager can give an aggregate view of an incident, leveraging aspects of the network security service of the invention including traffic analysis, M2M detection analysis, etc., indicating for example M2M devices whose behaviour has changed markedly, M2M devices quarantined/revoked, etc. As well as allowing an Analyst to choose a particular incident for investigation/scrutinization, the incident manager allows an Analyst to launch an incident/campaign, resulting in for example specified devices being monitored by the network security service of the invention, and possible quarantine/revocation as already described. Other capabilities of this aspect of the invention include allowing detailed views of the proportion of M2M devices versus human devices on the network, etc.

The network security service of the invention embodied as an analytics system/module is distributed over several servers in the preferred embodiment but is not precluded from being on one server.

The network security service of the invention can be embodied in another network service, for example a Network Protection and Policy system (or equivalent or similar, such as that provided by the AMS NPP (or equivalent or similar)), etc.

The network security service of the invention can embody many services including but not limited to an analytics module and a Network Protection and Policy system (or equivalent or similar, such as that provided by the AMS NPP (or equivalent or similar)) etc.

The SMS Interception/Policy Enforcement Point (which may or not be an AMS system) can be separate from or embodied in a Network Protection and Policy System (such as that provided by the AMS NPP (or equivalent or similar)).

As well as to mobile or embedded mobile/M2M devices the invention may be applied to fixed devices or to communications involving fixed devices. M2M/EM devices include a very broad and diverse range of devices and the scope of the invention includes what is being increasingly referred to as emerging devices or embedded devices and further what is referred to as the Internet of Things (IoTs) i.e. devices which have IP connectivity whose connectivity can be via access networks, mobile or fixed networks or any combination of such, and include examples (which are non limiting) such as vehicular devices, medical devices, mobile phones, vending machines, digital signage, home appliances, etc. The methods of the invention are not just applicable to M2M devices but are universally applicable in differentiating human controlled device behaviour from algorithmically controlled behaviour of a network participant (i.e. any actor device on the network), with a key aspect being that the device exhibits patterns which allow it to be identified as being algorithmically controlled. Thus advantageously the invention can be applied to other applications than embedded mobile/M2M security, which include such applications as anti-SPAM for many varied types of communications including IP and messaging (such as SMS) on a network.

The invention is also able to detect devices from which both machine-generated/algorithmically-generated and human-generated messages are sent and can differentiate between senders who are M2M devices and senders who exhibit patterns of both human and machine traffic (which can be device application originated). This situation arises as a result of normal phones which have applications installed which can send or receive application messaging traffic, typically unknown to the subscriber i.e. the device's human owner. The network security service of the invention can differentiate and separate the device application's messages from the messages written by the device's human owner based on their event features. This allows the two types of messaging traffic to be handled differently by the network security service of the invention, which can be achieved for example by the network security service of the invention (for example by itself, or incorporating or communicating with a Network Protection and Policy system (or equivalent or similar) such as that provided for example by the AMS NPP (or equivalent or similar)) employing different security policies, and further enabling the device owner to be notified that protocol messages are being sent by the device.

The invention is not limited to but applies to any type of device involved in IP communication or other network communication.

The invention also includes messaging communications within scope, including capture, tracking/monitoring and analysis of such communications and taking effective action. Such messaging communications include and are not limited to SMS (as already described), IM, SIP, MMS, push services, Over The Top (OTT) messaging services/providers (such as Apple iMessage, BlackBerry Messenger, Whatsapp, Skype, Facebook Messenger, Google Talk, KakaoTalk, Viber, etc.) etc. The invention also applies to capture, tracking/monitoring, analysis and taking effective action such as for example performing policy control for/on SMPP traffic between for example a VASP (or an SMPP inter carrier gateway) and an SMSC, to block any communication between an M2M device and any other entity, other than a legitimate M2M command and control centre for the M2M device.

It will be appreciated that the invention can be employed with data from many different sources including data traffic originating from devices on the network, and also including such as for example data obtained from call data records (CDR), or network elements such as for example a RADIUS enabled network entity, or databases such as for example prepaid or postpaid databases, or data from other types of systems which may be in or related to the network, etc. Such data may be related to or derived from traffic information but does not necessarily have to be.

The invention applies to all variants of mobile network standards/technologies/environments and their associated families such as CDMA/3GPP2 family of standards/technologies/environments (for example IS-95/CDMA 2000 1×RTT/CDMA 2000 1×EV-DO/CDMA2000 1×EVDV, etc.), GSM/3GPP family of standards/technologies/environments (e.g. GPRS, EDGE, UMTS etc.) and beyond including more modern variants such as 3GPP IMS or 3GPP LTE/LTE Advanced/4G or WiMAX/WiMAX-advanced networks/standards/technologies/environments, and including hybrid networks/standards/technologies/environments and future networks/standards/technologies/environments, and applies also to fixed line such as wireline. The scope of the invention as well as applying to IP networks and any networks involved in packet communication also includes any access networks/standards/technologies/environments such as WiFi, WiMAX, WiMAX-advanced, DSL, Cable etc. or hybrid or variant networks/standards/technologies/environments or any combination of networks/standards/technologies/environments, for example WiFi/WiMAX accessing a mobile or fixed (for example cable) network. In the specification the term operator or network operator or any variation thereof includes any communications and/or network service provider and can be a mobile operator or fixed line operator such as for example an Internet Service Provider, and can also include a cable operator, or operators of hybrid or variant technology networks, or any combination of such, for example an operator of a WiFi/WiMAX network accessing their own or other mobile operator's network or fixed operator's (for example cable operator's) network. The invention is applicable to Enterprises.

In this patent specification the term Command and Control centre is interpreted in its broadest sense and includes collection nodes for event collection from M2M devices which are in communication with such collection nodes. Advantageously since the invention does not rely on numbering or other device identification to identify an M2M device it works equally well with devices which have multiple identifiers, such as having multiple SIMs provisioned.

The invention can be clearly understood from the previous descriptions of embodiments thereof, given by way of example only. If in the descriptions of embodiments there are some details applicable to SMS, this is in no way to be construed that the invention is more applicable to SMS as the invention is applicable to many varied types of communications including IP and messaging.

The embodiments in the invention described with reference to the drawings comprise a computer apparatus and/or processes performed in a computer apparatus. However, the invention also extends to computer programs, particularly computer programs stored on or in a carrier adapted to bring the invention into practice. The program may be in the form of source code, object code, or a code intermediate source and object code, such as in partially compiled form or in any other form suitable for use in the implementation of the method according to the invention. The carrier may comprise a storage medium such as ROM, e.g. CD ROM, or magnetic recording medium, e.g. a floppy disk or hard disk. The carrier may be an electrical or optical signal which may be transmitted via an electrical or an optical cable or by radio or other means.

In the specification the terms "comprise, comprises, comprised and comprising" or any variation thereof and the terms include, includes, included and including" or any variation thereof are considered to be totally interchangeable and they should all be afforded the widest possible interpretation and vice versa.

The invention is not limited to the embodiments hereinbefore described but may be varied in both construction and detail.

Glossary

| Abbreviation/Term | Description |
|---|---|
| 3GPP | Third Generation Partnership Project |
| 3GPP2 | Third Generation Partnership Project 2 |
| AMS | Adaptive Mobile Security |
| APN | Access Point Name |
| CEIR | Central Equipment Identity Register |
| DSL | Digital Subscriber Line |
| EDGE | Enhanced Data rates for GSM Evolution |
| EIR | Equipment Identity Register |
| EM | Embedded Mobile |
| ESN | Electronic Serial Number |
| FQDN | Fully qualified Domain Name |
| GSM | Global System for Mobile communication |
| ICAP | Internet Content Adaptation Protocol |
| ICCID | Integrated Circuit Card ID |
| IMPI | Internet Protocol Multimedia Private Identity |
| IP | Internet Protocol |
| GPRS | General Packet Radio Service |
| GGSN | Gateway GPRS Support Node |
| GPS | Global Positioning System |
| GT | Global Title |
| GTP | GPRS Tunneling Protocol |
| HLR | Home Location Register |
| IMEI | International Mobile Equipment Identity |
| ISDN | Integrated Services Digital Network |
| IMSI | International Mobile Subscriber Identity |
| LBS | Location Based Services |
| MAP | Mobile Application Part |
| MCC | Mobile Country Code |
| MDN | Mobile Directory Number |
| MEID | Mobile Equipment Identifier |
| MMO | Mobile Machine Operator |
| MNC | Mobile Network Code |
| MNO | Mobile Network Operator |
| MSC | Mobile Switching Centre |
| MSISDN | Mobile Subscriber ISDN Number |
| M2M | Machine to Machine |
| MVNO | Mobile Virtual Network Operator |

-continued

Glossary

| Abbreviation/Term | Description |
|---|---|
| NAI | Network Access Identifier |
| NPP | Network Protection Platform |
| PCRF | Policy and Charging Rules Function |
| PDN | Packet Data Network |
| PEP | Policy Enforcement Point |
| PGW | PDN Gateway |
| RADIUS | Remote Authentication Dial in User Service |
| SCA | Service Centre Address |
| SCCP | Signalling Connection Control Part |
| SGSN | Serving GPRS Support Node |
| SGW | Serving Gateway |
| SIM | Subscriber Identity Module |
| SIP | Session Initiation Protocol |
| SMS | Short Message Service |
| SMSC | Short Message Service Centre |
| SMTP | Simple Mail Transfer Protocol |
| STP | Signalling Transfer Point |
| SS7 | Signalling System No. 7 |
| TCP | Transport Control Protocol |
| UI | User Interface |
| URI | Uniform Resource Identifier |
| URL | Uniform Resource Locator |
| VASP | Value Added Service Provider |
| WiMAX | Worldwide Interoperability for Microwave Access |

The invention claimed is:

1. A security system for use in a communications network, said network comprising means to allow a plurality of devices to communicate over the network wherein at least one device is a machine to machine (M2M) operated device and at least one other device is a human operated device, said security system comprising:

a data capture module to capture data traffic originating from the plurality of devices on the network;

an analyser module to analyse the data traffic, the analyser module configured to extract features from the captured data traffic, wherein the features describe behavioural patterns of individual M2M devices on the network, and wherein feature extraction is configured to (i) extract events from the captured traffic data and collate them by sender in order to derive per-device features, (ii) calculate statistics which refer to multiple events from the same sender, such that one or more characteristic profile features is calculated for a given sender device, and (iii) extract vocabulary data from the captured data traffic and compute a distribution of word frequencies from the vocabulary data to determine whether a device exhibits human or machine originated traffic; and an identifier module to identify at least one of the M2M operated devices on the network based on the analysed data traffic, wherein the system is configured to dynamically adapt to different data traffic patterns on the network.

2. The security system as claimed in claim 1 comprising means to extract features from the captured data traffic wherein these features describe the behavioural patterns of individual devices on the network wherein the feature extraction comprises extraction of event content features from a traffic stream, which describe the single event based on its content.

3. The security system of claim 1 wherein if a particular device is identified as a M2M device, the system comprises means to store the traffic patterns to and from the M2M device, wherein said patterns are adapted to be used as baseline reference traffic patterns for detecting other M2M devices.

4. The security system of claim 1 comprising means to ascertain if there are traffic patterns corresponding to normal characteristic patterns associated with M2M device activity, wherein said patterns are configured to be used as control signature patterns for detecting other M2M devices behaving normally.

5. The security system of claim 1 comprising means to ascertain if there are traffic patterns corresponding to normal characteristic patterns associated with M2M device activity, wherein said patterns are configured to be used as control signature patterns for detecting other M2M devices behaving abnormally.

6. The security system of claim 1 comprising means to ascertain out-of-the- ordinary communication patterns associated with M2M device activity, wherein said patterns are configured to be used as control signature patterns for detecting other M2M devices behaving abnormally.

7. The security system of claim 1 comprising means for analysing traffic patterns to discern and analyse message content features and/or other traffic information with reference to dynamic pattern rules and means for aggregating such message content features across all messages sent by a device to detect which M2M group a device belongs to.

8. The security system of claim 1 wherein said means for analysing comprises means for computing a total word vocabulary of messages sent by a device, wherein a distribution of word frequencies of the total word vocabulary acts as a signature for the text of messages originating from the device; and means for identifying at least one of the M2M operated devices from said computed word vocabulary.

9. The security system of claim 1 comprising means for labelling M2M devices using stored patterns of known devices which are known to be M2M devices, wherein the patterns of known devices are stored in a device information store, wherein the patterns are used to predict whether other devices are M2M.

10. The security system of claim 1 comprising means for labelling M2M devices using stored patterns of suspected devices which are suspected to be M2M devices, wherein the patterns of suspected devices are stored in a device information store, and wherein the patterns are used to predict whether other devices are M2M.

11. The security system of claim 1 comprising means for clustering similar devices, wherein each cluster comprises a model of a typical traffic pattern.

12. The security system of claim 1 comprising means for clustering similar devices, wherein each cluster comprises a model of a typical traffic pattern; means for extracting, for each cluster, a general characterisation of the patterns that the devices in it share, such that the regularity measure is on average in a certain range, or that most elements of the cluster send to a similar number of peers.

13. The security system of claim 1 comprising means for clustering similar devices, wherein each cluster comprises a model of a typical traffic pattern; means for extracting, for each cluster, a general characterisation of the patterns that the devices in it share, such that the regularity measure is on average in a certain range, or that most elements of the cluster send to a similar number of peers; means for detecting a shift in a traffic pattern to determine a change in device behaviour, wherein a sudden change in behaviour from a device indicates suspicious behaviour.

14. The security system of claim 1 comprising at least one network probe for data traffic acquisition, wherein the network probe comprises means for generating statistics on any layer of the communication stack that has information that is of interest.

15. The security system of claim 1 wherein the means for analysing comprises examining at least one unique identifier obtained from the captured data traffic.

16. The security system as claimed in claim 1 comprising means to detect devices from which both machine-generated or algorithmically-generated and human-generated data are sent and means for differentiating between senders who are M2M devices and senders who exhibit patterns of both human and machine traffic.

17. The security system of claim 1 comprising means for detecting normal traffic characteristic patterns for an M2M device configured to detect out of the ordinary communication patterns to and from an M2M device; means to establish whether the out of the ordinary communication poses a security or other threat or signifies malicious activity; and means for applying security defensive measures if a security threat is posed.

18. A method of providing security in a communications network, said network comprising means to allow a plurality of devices to communicate over the network wherein at least one device is a machine to machine (M2M) operated device and at least one other device is a human operated device, said method comprising:
    capturing data traffic originating from the plurality of devices on the network;
    analysing the data traffic by extracting features from the captured data traffic, wherein the features describe the behavioural patterns of individual M2M devices on the network, and wherein feature extraction is configured to (i) extract events from the captured traffic data and collate them by sender in order to derive per-device features, (ii) calculate statistics which refer to multiple events from the same source, such that one or more characteristic profile features is calculated for a given sender device, and (iii) extract vocabulary data from the captured data traffic and compute a distribution of word frequencies from the vocabulary data to determine whether a device exhibits human or machine originated traffic; and
    identifying at least one of the M2M operated devices on the network based on the analysed data traffic, wherein the method dynamically adapts to different data traffic patterns on the network.

* * * * *